United States Patent
Dai et al.

(10) Patent No.: US 10,946,525 B2
(45) Date of Patent: Mar. 16, 2021

(54) ROBOT CONTROL SYSTEM AND ROBOT CONTROL METHOD

(71) Applicant: HITACHI, LTD., Tokyo (JP)

(72) Inventors: Jingze Dai, Tokyo (JP); Tomohiro Matsuda, Tokyo (JP); Hideya Yoshiuchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 357 days.

(21) Appl. No.: 15/858,374

(22) Filed: Dec. 29, 2017

(65) Prior Publication Data

US 2018/0207802 A1 Jul. 26, 2018

(30) Foreign Application Priority Data

Jan. 26, 2017 (JP) .............................. JP2017-012258

(51) Int. Cl.
  *G05B 19/418* (2006.01)
  *B25J 9/16* (2006.01)
  *B25J 11/00* (2006.01)

(52) U.S. Cl.
  CPC .......... *B25J 9/1682* (2013.01); *B25J 9/1669* (2013.01); *B25J 11/008* (2013.01)

(58) Field of Classification Search
  CPC ...... B25J 9/1682; B25J 9/1669; B25J 9/0003; B25J 11/003–004; B25J 11/008–009; G06N 3/008
  See application file for complete search history.

(56) References Cited

U.S. PATENT DOCUMENTS

| 8,010,231 | B2 | 8/2011 | Sumida et al. |
| 8,285,417 | B2 | 10/2012 | Kawaguchi et al. |
| 9,821,455 | B1 * | 11/2017 | Bareddy ................ B25J 9/0084 |
| 2005/0113974 | A1 | 5/2005 | Doi |
| 2008/0109114 | A1 * | 5/2008 | Orita ..................... H02J 7/0027 |
| | | | 700/248 |

(Continued)

FOREIGN PATENT DOCUMENTS

| JP | 2005-103722 A | 4/2005 |
| JP | 2007157166 A * | 6/2007 |

(Continued)

OTHER PUBLICATIONS

Japanese Office Action dated Jun. 2, 2020 for the Japanese Patent Application No. 2017-012258.

*Primary Examiner* — Harry Y Oh

(74) *Attorney, Agent, or Firm* — Volpe Koenig

(57) ABSTRACT

A robot control system controlling a robot executing a personal service includes: a storage unit configured to store therein in advance trigger action information for which a task to be executed by the robot is formed by a series of actions and the actions and trigger conditions for respectively starting the actions are specified; a trigger determination unit configured to determine whether a trigger condition of the action is satisfied; an action execution unit configured to execute the action; and a task execution unit configured to sequentially select an action specified in the trigger action information of the task to be executed by the robot, cause the trigger determination unit to determine whether a trigger condition of the selected action is satisfied, and cause the action execution unit to execute the action when the trigger condition is satisfied.

17 Claims, 27 Drawing Sheets

(56) References Cited

U.S. PATENT DOCUMENTS

| | | | | |
|---|---|---|---|---|
| 2009/0015404 A1* | 1/2009 | Lin | .................... | B25J 9/1682 |
| | | | | 340/540 |
| 2016/0059412 A1* | 3/2016 | Oleynik | ................ | B25J 9/0087 |
| | | | | 700/257 |
| 2017/0050321 A1* | 2/2017 | Look | ............. | G06Q 10/063118 |

FOREIGN PATENT DOCUMENTS

| | | |
|---|---|---|
| JP | 2007-249801 A | 9/2007 |
| JP | 2009-136932 A | 6/2009 |
| JP | 2009-136967 A | 6/2009 |

\* cited by examiner

Fig. 3

| Universal task number (13101) | Task name (13102) | Response capability requirement (13103) | Other task parallel executability (13104) | Trigger action configuration table location (13105) |
|---|---|---|---|---|
| 00001 | task_greet | Camera equipped, speaker equipped, microphone equipped | Unavailable | AA/BB/task_greet_single form |
| 00002 | task_search suspicious object | Camera equipped, movement mechanism equipped (optional) | Available | AA/BB/task_search suspicious object_single form |
| 00003 | task_location guide | Camera equipped, speaker equipped, microphone equipped, movement mechanism equipped | Available | AA/BB/task_location guide_single form |

Fig. 4

| Task management number | Universal task number | Responding method |
|---|---|---|
| 201608010001R1R2 | 00003 | Coordination response |
| 201608010002R2 | 00002 | Single response |

Table file name: task_greet_single_form

| Trigger number | Trigger determination expression | Action | Action requirement capability | Action parallel executability | Action omissibility |
|---|---|---|---|---|---|
| 0 | function_person approach detection (function execution robot ID, 10 meters)==detection | function_target lock (function execution robot ID) | Camera equipped | Available | Unavailable |
| 1 | True | function_face orientation adjustment (function execution robot ID) | Camera equipped | Available | Available |
| 2 | function_distance determination (function execution robot ID, target coordinate)<=5 meters | function_body orientation adjustment (function execution robot ID) | Camera equipped | Available | Unavailable |
| -1 | function_front detection (function execution robot ID)==detection | function_greet (function execution robot ID) | Camera equipped, speaker equipped, microphone equipped | Unavailable | Unavailable |

Fig. 9

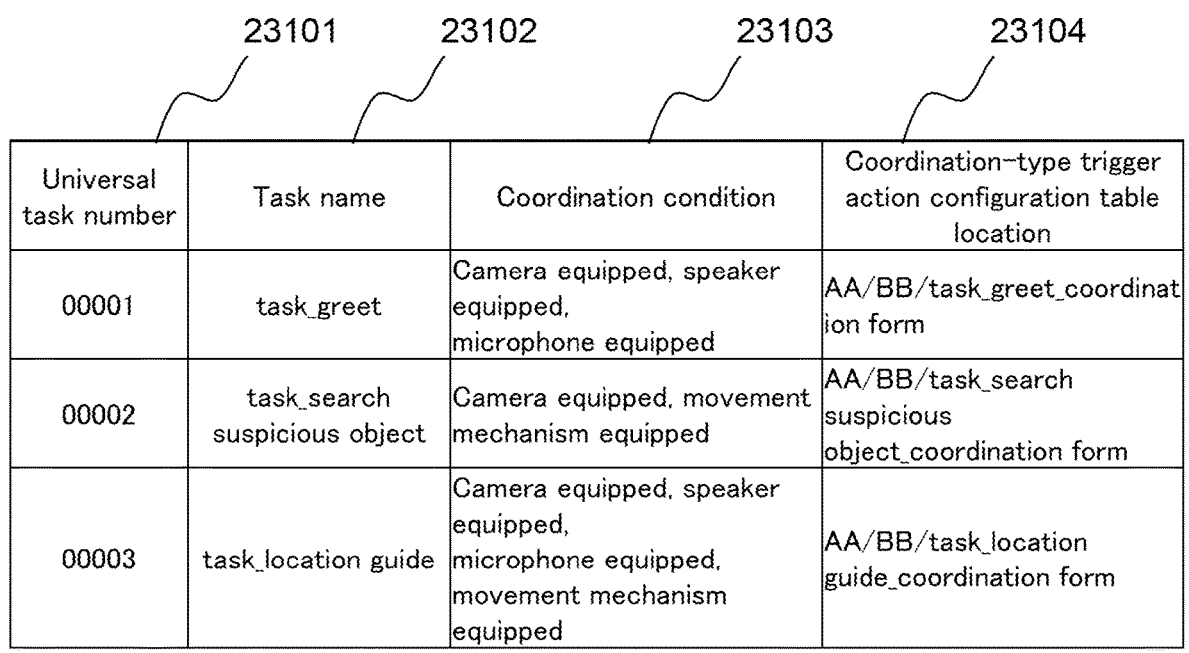

| Universal task number | Task name | Coordination condition | Coordination-type trigger action configuration table location |
|---|---|---|---|
| 00001 | task_greet | Camera equipped, speaker equipped, microphone equipped | AA/BB/task_greet_coordination form |
| 00002 | task_search suspicious object | Camera equipped, movement mechanism equipped | AA/BB/task_search suspicious object_coordination form |
| 00003 | task_location guide | Camera equipped, speaker equipped, microphone equipped, movement mechanism equipped | AA/BB/task_location guide_coordination form |

Fig. 10

| Task management number | Universal task number | Involving robot ID |
|---|---|---|
| 201608010001R1R2 | 00003 | R1, R2 |

Table file name: location guide_coordination form

| Trigger number | Trigger determination expression | Action | Involving robot | Action requirement capability | Action parallel executability |
|---|---|---|---|---|---|
| 0 | True | function_coordinate information transmission (function execution robot ID: coordination source ID, coordination source coordinate), function_coordinate information reception (function execution robot ID: coordination destination ID) | Coordination source coordination destination | Unspecified | Available |
| 1 | function_coordinate information reception (function execution robot ID: coordination destination ID)==success | function_movement(function execution robot ID: coordination destination ID, coordination source coordinate) | Coordination destination | Movable | Available |
| 2 | True | function_explain situation to person (function execution robot ID: coordination source ID) | Coordination source | Camera equipped, speaker equipped | Available |
| 3 | function_distance determination (function execution robot ID: coordination destination ID, coordination source coordinate)==5 meters && function_orientation adjustment (function execution robot ID: coordination source ID, coordination destination coordinate)==end | function_simulation coordination conversation between robots (function execution robot ID: coordination source ID, function execution robot ID: coordination destination ID), function_information handover (function execution robot ID: coordination source ID, function execution robot ID: coordination destination ID) | Coordination source coordination destination | Camera equipped, speaker equipped | Available |
| -1 | function_coordination conversation (function execution robot ID: coordination source ID)==end | function_other task execution (task execution robot ID: coordination destination ID, location guide_single form) | Coordination destination | Camera equipped, speaker equipped, microphone equipped, movement mechanism equipped | Available |

Fig. 12

| Task management number | Current trigger determination expression | Current action | Coordination-type trigger action configuration table location | Current trigger number |
|---|---|---|---|---|
| 201608010001R1R2 | function_coordinate information reception (R2)==success | function_movement (R2, (100,21,0)) | AA/BB/task_location guide_coordination form | 1 |

Fig. 15

| Message identifier (M201) | Universal task number of requested task (M202) | Request source ID (M203) |
|---|---|---|
| M20000021 | 00003 | R1 |

Fig. 16

| Message identifier (M301) | Trigger determination expression (M302) | Request source ID (M303) | Request destination ID (M304) |
|---|---|---|---|
| M30000135 | function_coordinate information reception (R2)==success | R1 | R2 |

Fig. 17

| Message identifier (M401) | Trigger determination result (M402) | Request source ID (M403) | Request destination ID (M404) |
|---|---|---|---|
| M40000135 | True | R1 | R2 |

Fig. 18

| Message identifier | Trigger calculation expression | Request source ID | Request destination ID |
|---|---|---|---|
| M50020003 | function_distance determination (R2, (100,21,0))==5 meters | R1 | R2 |

M501 M502 M503 M504

ROBOT CONTROL SYSTEM AND ROBOT CONTROL METHOD

BACKGROUND

The present invention relates to a technology of controlling a robot configured to provide services to people.

Research and development of a personal service robot configured to provide services to people is accelerating. Further, robots are starting to actually provide various services to people. Personal services provided by robots include services provided by a single robot and services provided by a plurality of robots. Japanese Patent Application Publication No. 2007-249801 discloses a robot coordination system in which services are securely provided and robot resources are effectively utilized by coordinating a plurality of robots to execute a series of flow processing.

SUMMARY

When a behavior of a robot providing personal services and a behavior that is expected to be shown if those personal services are provided by a person are different from each other, a user receiving those personal services may feel that something is wrong. For example, when the robot does not appropriately show a behavior at a timing at which a person would have shown the behavior, the user may feel that something is wrong with the behavior of the robot. Further, if services are provided to the user by a plurality of robots in coordination with each other, the user may feel that something is wrong when a certain robot suddenly takes over an operation of another robot. A person is expected to show a behavior for taking over the operation. Thus, when the robots suddenly pass the operation to each other, the user cannot understand that the robots are coordinating and feels that something is wrong with that behavior.

When the user is requesting some kind of personal service of the robot from the robot or a system, the user will feel uncomfortable if the user does not know whether the robot or the system has understood the intention of the service request correctly. As a result, even if the service is executed correctly, the user may request the same service again or cancel the service in progress. Therefore, in the personal service, it is desired to enable the user to understand the behavior of the robot and the intention thereof so that the user feels as less sense of discomfort as possible.

However, the provision of a service that is natural for the user is not taken into consideration in the system of Japanese Patent Application Publication No. 2007-249801. For example, a feature of enabling the user to understand the intention of the behavior of the robot is not taken into consideration, and the system does not include a configuration for such feature.

The object of the present invention is to provide a feature in which a service can be provided in a personal service of a robot in a way that is natural for a user.

A robot control system according to one aspect of the present invention is a robot control system controlling a robot configured to execute a personal service, the robot control system including: a storage unit configured to store therein in advance trigger action information for which a task to be executed by the robot is formed by a series of actions and the actions and trigger conditions for respectively starting the actions are specified; a trigger determination unit configured to determine whether a trigger condition of the action is satisfied; an action execution unit configured to execute the action; and a task execution unit configured to sequentially select an action specified in the trigger action information of the task to be executed by the robot, cause the trigger determination unit to determine whether a trigger condition of the selected action is satisfied, and cause the action execution unit to execute the action when the trigger condition is satisfied.

According to the abovementioned aspect, the task to be performed by the robot is formed of the series of actions, the trigger condition is configured for each action, and the robot is caused to execute the action if the trigger condition is satisfied. Therefore, when the robot starts the action, a trigger condition that is natural for the user can be configured and the natural personal service can be provided.

According to the disclosure, in the personal service of the robot, the service can be provided in a way that is natural for the user.

BRIEF DESCRIPTION OF THE DRAWINGS

FIG. 3 is a diagram illustrating a configuration example of a task library table 131;

FIG. 4 is a configuration diagram of a received task table 132;

FIG. 5 is a configuration diagram of a trigger action configuration table 134;

FIG. 9 is a configuration diagram of a coordination-type task library table 231;

FIG. 10 is a configuration diagram of a received coordination-type task table 232;

FIG. 11 is a configuration diagram of a coordination-type trigger action configuration table 234;

FIG. 12 is a configuration diagram of an executing coordination-type task state table 233;

FIG. 15 is a diagram illustrating a coordination request message M2;

FIG. 16 is a diagram illustrating a trigger determination request message M3;

FIG. 17 is a diagram illustrating a trigger determination result message M4;

FIG. 18 is a diagram illustrating a trigger calculation request message M5;

DETAILED DESCRIPTION OF THE EMBODIMENT

Figure 1:
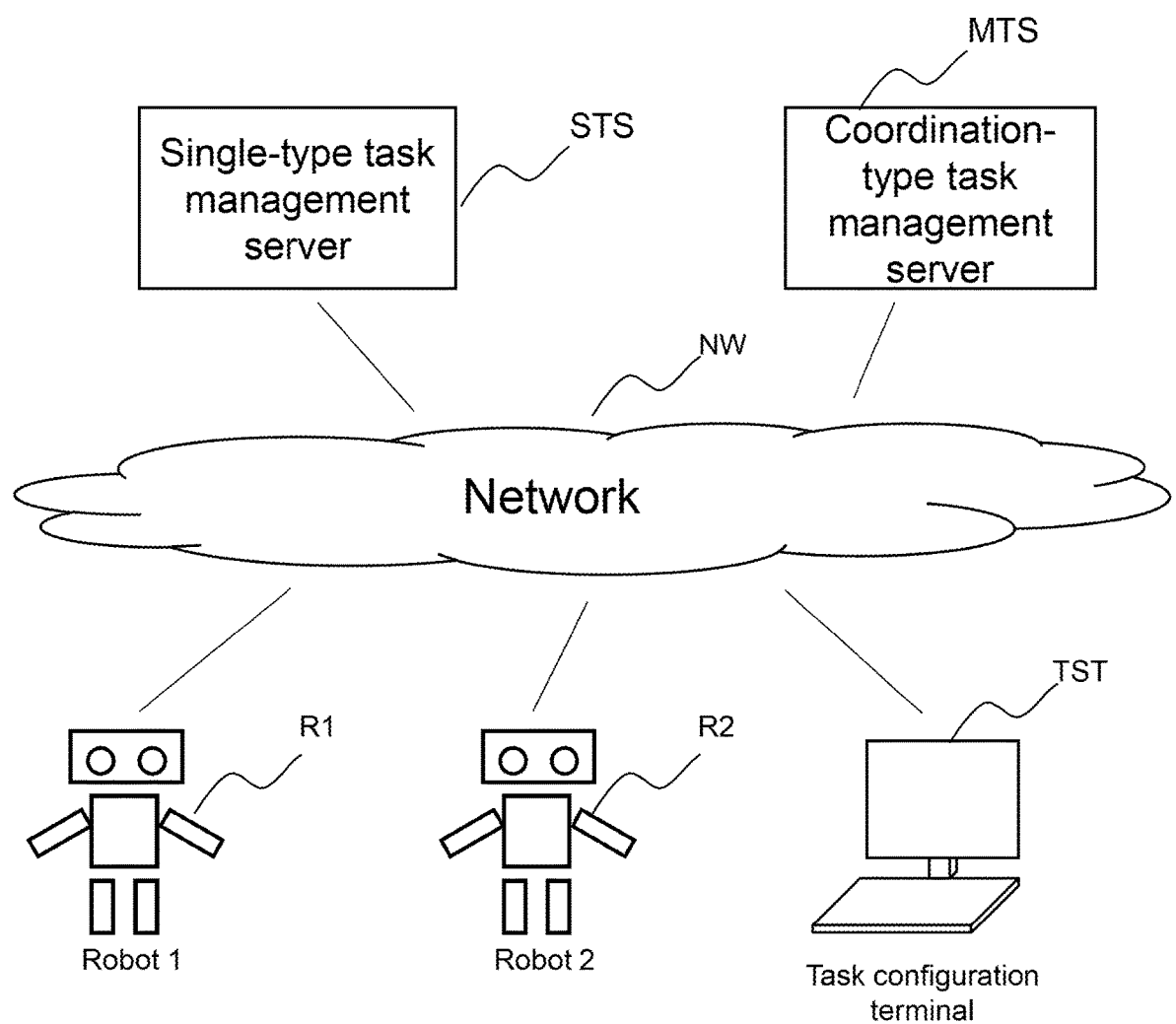
FIG. 1 is a system configuration diagram of a service robot system according to this Embodiment.

An Embodiment of the present invention is described in detail with reference to the drawings.
Description of the System Configuration FIG. 1 is a system configuration diagram of a service robot system according to this Embodiment. The service robot system includes robots R1 and R2, a single-type task management server STS, a coordination-type task management server MTS, and a task configuration terminal TST. The robots R1 and R2, the single-type task management server STS, the coordination-type task management server MTS, and the task configuration terminal TST are coupled to a network NW.

The robots R1 and R2 are robots configured to provide various services to a user. The robot is an information processing apparatus that can move autonomously. The services to be provided by the robots R1 and R2 are personal services to be provided to the user by the robots R1 and R2 in accordance with a request of the user or the situation. The personal service is configured as a task for each service content and each task includes a series of a plurality of actions.

The single-type task management server STS is a server configured to control a service providable by a single robot. When a single robot provides a service, the actions included in the task of the service are all executed by one robot.

The coordination-type task management server MTS is a server configured to control a service to be provided by a plurality of robots in coordination with each other. When a plurality of robots provide a service in coordination with each other, the actions included in the task of the service are shared among the plurality of robots. The network NW is configured to couple the robots R1 and R2, the single-type task management server STS, the coordination-type task management server MTS, and the task configuration terminal TST to each other. Various configurations such as a wired LAN (Local Area Network), a wireless LAN, and a mobile communication network can be used for the network NW, and the network NW may be formed of a plurality of kinds of those networks. The installation location of the robots R1 and R2 and the installation location of the single-type task management server STS or the coordination-type task management server MTS may be different, the network NW may be a WAN (Wide Area Network), and the robots R1 and R2 and the single-type task management server STS and the coordination-type task management server MTS having different installation locations may be coupled to each other via the WAN. An example including two robots is illustrated in FIG. 1, but the present invention is not limited thereto. There may be any number of robots.

The task configuration terminal (TST; Task Setting Terminal) is a terminal configured to configure the task of each service for the single-type task management server STS and the coordination-type task management server MTS, and includes an interface to be coupled to the network NW. The task configuration terminal communicates with the single-type task management server STS and the coordination-type task management server MTS via the network NW.

The main role of the task configuration terminal TST is to update or edit a trigger action configuration table in the single-type task management server STS or the coordination-type task management server MTS.

Figure 2:
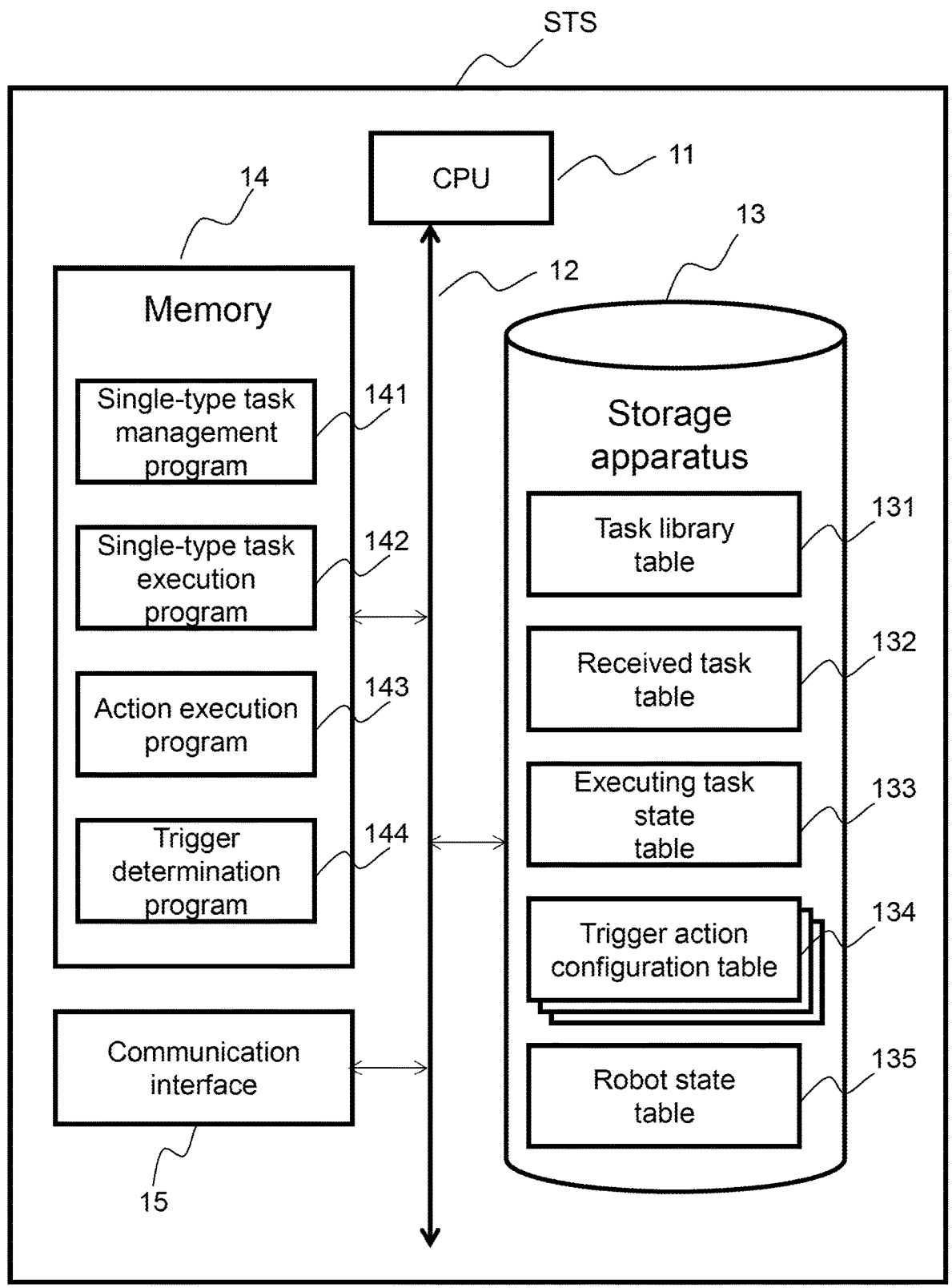
FIG. 2 is a block diagram illustrating a configuration of hardware and software of a single-type task management server STS.

The trigger action configuration table is a table in which the actions forming the abovementioned task and trigger conditions for starting the execution of the actions are configured. When the trigger action configuration table is updated or edited by a person such as a manager, the task configuration terminal TST includes input and output devices. The input device is a keyboard and a mouse, for example, and the output device includes a display and a printer, for example. When the update or the editing is not performed by a person and is performed by an artificial intelligence program, for example, the task configuration terminal TST has an environment for executing the program. When the task configuration terminal TST updates and edits a trigger action configuration table 134 on the single-type task management server STS or the coordination-type task management server MTS, an FTP (File Transfer Protocol) is used as a communication protocol, for example. The task configuration terminal TST can also update and edit other tables in a data memory of the single-type task management server STS or the coordination-type task management server MTS by a method similar to that used in the update or the editing of the trigger action configuration table.
Description of the Configuration of the Single-Type Task Management Server STS FIG. 2 is a block diagram illustrating a configuration of hardware and software of the single-type task management server STS (Single-type Task Server). The single-type task management server STS includes a CPU (Central Processing Unit) 11 including a microprocessor, and a storage apparatus 13, a memory 14, and a communication interface 15 are coupled to the CPU 11 via a bus 12. The communication interface 15 is configured to transmit and receive messages to and from the coordination-type task management server MTS and the task configuration terminal TST in accordance with a communication protocol specified by the network NW' under the control of the CPU 11. As the communication protocol, a TCP/IP (Transmission Control Protocol/Internet Protocol) and the like is used, but other communication protocols may be used.

The storage apparatus 13 stores therein a task library table 131, a received task table 132, an executing task state table 133, the trigger action configuration table 134, and a robot state table 135. The abovementioned trigger action configuration table is the trigger action configuration table 134 illustrated in FIG. 2.

In the configurations of FIG. 1 and FIG. 2, trigger action information (trigger action configuration table 134) is stored in the storage apparatus 13 in advance. In trigger action information, the task to be executed by the robot is formed of a series of actions, and the actions and trigger conditions for starting the actions are specified. A trigger determination unit (a trigger determination program 144 on the memory 14) determines whether the trigger condition of the action is satisfied. An action execution unit (an action execution program 143 on the memory 14) executes an instructed action. A task execution unit (a single-type task execution program on the memory 14) sequentially selects the action specified in the trigger action information of the task to be executed by the robot, and causes the trigger determination unit to determine whether the trigger condition of the selected action is satisfied. If the trigger condition is satisfied, the task execution unit causes the action execution unit to execute the action. The task to be performed by the robot is formed of a series of actions, the trigger condition is configured for each action, and the robot is caused to execute the action if the trigger condition is satisfied. Thus, a trigger condition that is natural for the user when the robot starts each action can be configured and a natural personal service can be provided.

FIG. 3 is a diagram illustrating a configuration example of the task library table 131. The task library table 131 stores therein a universal task number 13101, a task name 13102, a response capability requirement 13103, information indicating another task parallel executability 13104, and a trigger action configuration table location 13105 in association with each other.

The universal task number 13101 is unique in the service robot system and is used to identify the task.

The task name 13102 is the name of the task.

The response capability requirement indicates the capability necessary for the robot to respond to the task. To respond to the task means herein to execute the actions included in the task. It can be said that the response capability requirement is the capability necessary for the robot to execute the actions included in the task. The response capability requirement is determined so as to satisfy all the action requirement capabilities of all the actions included in the trigger action configuration table 134 corresponding to the task. The action requirement capability is the capability required for the robot to execute each action, and information thereof is configured for each action in the trigger action configuration table 134.

Sometimes, a certain task cannot be responded to, that is, the actions included in the task cannot be executed due to the limitation of the capability of the robot. For the same task, a method of responding to the task, that is, a method of executing the actions included in the task changes due to differences in capability among the robots. The method of responding to the task includes a single response and a coordination response, and there is also a case in which response is unavailable. The single response means that the robot responds to the task by itself. The coordination response means that the robot responds to the task in cooperation with other robots. When the response is unavailable, it means that the robot cannot respond to the task.

The other task parallel executability 13104 indicates whether the task is can be executed in parallel with other tasks by the same robot. An example of a method of determining the other task parallel executability 13104 is the following. That is, all of the trigger action configuration table 134 to be used in the single response and an action parallel executability 23407 in a coordination-type trigger action configuration table 234 to be used in the coordination response are checked. Then, the other task parallel executability 13104 is configured as unavailable when all the actions configured in the trigger action configuration table 134 and the coordination-type trigger action configuration table 234 cannot be executed in parallel with each other, and the other task parallel executability 13104 is configured available otherwise. The coordination-type trigger action configuration table 234 is described later with reference to FIG. 11.

The trigger action configuration table location 13105 indicates a save location of the trigger action configuration table 134.

FIG. 4 is a configuration diagram of the received task table 132. The received task table 132 stores therein a task management number 13201, a universal task number 13202, and a responding method 13203 in association with each other. The task management number 13201 is unique and invariant in the system and a numbering method is defined so that the date of occurrence of the task and the robot in charge can be grasped by decoding the number. In this Embodiment, the task management number 13201 is obtained by combining the date on which the task is received, a robot ID 13502, and a four-digit serial number for the same dates.

FIG. 5 is a configuration diagram of the trigger action configuration table 134. The trigger action configuration table 134 includes a plurality of table files for each task. Each table file is given a table file name 13401. Each table file of the trigger action configuration table 134 stores therein a trigger number 13402, a trigger determination expression 13403, an action 13404, an action requirement capability 13405, an action parallel executability 13406, and an action omissibility 13407 in association with each other. FIG. 5 illustrates an example of information to be stored in the trigger action configuration table 134.

The table file of the trigger action configuration table 134 is defined by the configuration of the triggers for respectively causing the series of actions included in the task. The universal task number 13202 of the received task table 132 illustrated in FIG. 4 is a number in one-to-one correspondence with the table file of the trigger action configuration table 134.

The action is a generic function that can be executed by the action execution program 143 or a character string indicating the actions included in the task included in the task library table 131. The action is, for example, a function that causes the robot to wave its hand or a character string indicating the action of taking out sensor information from a sensor 311 of the robot.

The trigger condition for causing the action is defined by the trigger determination expression 13403. The trigger determination expression 13403 includes a generic function having a return value that can be executed by the trigger determination program 144 or a character string indicating a conditional expression using the task included in the task library table 131. When the trigger determination expression 13403 is determined to be true by the trigger determination program 144, the action of the action 13404 is executed by the action execution program 143. When the trigger determination expression 13403 is "true" as in the action having the trigger number of 2, it means that the trigger determination expression is always true.

One trigger determination expression 13403 and the action 13404 corresponding thereto are linked to each other by the trigger number 13402 and are stored in one row of the trigger action configuration table 134. One trigger determination expression 13403 can respond to a plurality of actions. Further, by configuring the trigger condition of the trigger determination expression 13403 of a plurality of successive actions to be always "true", the actions 13404 to which the plurality of trigger numbers 13402 correspond can be unconditionally executed in a successive manner.

The trigger number 13402 is a number indicating the first action, the last action, and the order of the actions when the plurality of actions 13404 are executed. For example, in the example of FIG. 5, the trigger number 13402 of the first action 13404 is 0 and the trigger number 13402 of the last action 13404 is −1. The actions 13404 beside those actions are given the trigger numbers 13402 that are serial numbers in the order of execution.

The action requirement capability 13405 is the capability required for the robot to execute the action. In order for a certain robot to execute the action, the capability of the robot (task response capability 13503) needs to include the action requirement capability 13405. The task response capability 13503 is described later with reference to FIG. 7.

The action parallel executability 13406 indicates whether the action can be executed in parallel with other actions.

Figure 6:
FIG. 6 is a configuration diagram of an executing task state table 133.

The action omissibility 13407 indicates whether a robot that does not satisfy the capability specified by the action requirement capability 13405 can skip that action and execute the next action. FIG. 6 is a configuration diagram of the executing task state table 133. The executing task state table 133 stores therein a task management number 13301, a current trigger determination expression 13302, a current action 13303, a trigger action configuration table location 13304, a current trigger number 13305, and another task parallel executability 13306 in association with each other. FIG. 6 illustrates an example of information to be stored in the executing task state table 133. The executing task state table 133 is information to be updated by a single-type task management program 141, a single-type task execution program 142, a coordination-type task management program 241, and a coordination-type task execution program 242. The executing task state table 133 indicates the progress of the single-type task and the coordination-type task in execution. The detail of the update of the executing task state table 133 is described later.

Figure 7:
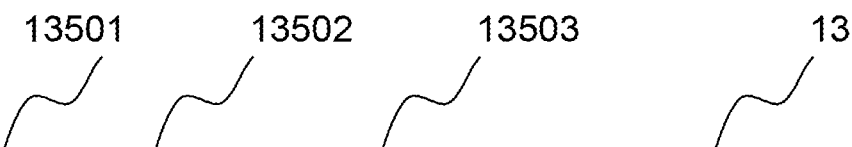
FIG. 7 is a configuration diagram of a robot state table 135.

FIG. 7 is a configuration diagram of the robot state table 135. The robot state table 135 stores therein a robot name 13501, a robot ID 13502, a task response capability 13503, and a task management number 13504 of the current task in association with each other. FIG. 7 illustrates an example of information to be stored in the robot state table 135. The task response capability 13503 indicates the capability of the robot. The single-type task management server STS determines how to respond to the task (the responding method 13203 of the robot) on the basis of the capability of the robot indicated in the task response capability 13503.

In the response capability requirement 13103 of the task library table 131 illustrated in FIG. 3, the capability corresponding to the action requirement capability of an omittable action is clearly expressed as "(optional)".

Returning to FIG. 2, the memory 14 stores therein the single-type task management program 141, the single-type task execution program 142, the action execution program 143, and the trigger determination program 144 as part of the programs necessary in this Embodiment. The single-type task management program 141 receives tasks and prepares execution by causing the CPU 11 to mainly execute the following processing.

Figure 14:
FIG. 14 is a diagram illustrating a task initial processing request message M1.

(1) When the single-type task management program 141 receives a task initial processing request message M1 via the communication interface 15 or the bus 12, the single-type task management program 141 refers to the task library table 131 and the robot state table 135 with use of a universal task number M102 of the requested task and the robot ID 13502 of the desired robot in the task initial processing request message M1, and determines whether the requested task is executable by the desired robot. The task initial processing request message M1 is illustrated in FIG. 14. The task initial processing request message M1 stores therein a message identifier M101, the universal task number M102 of the requested task, a robot ID M103 of a desired robot, and a request source ID M104. The requested task is a task requested in the initial processing request message M1 to be executed. The desired robot is a robot specified in the initial processing request message M1 that the robot is desired to be used in the execution of the requested task. At this time, the single-type task management program 141 can know the capability necessary for the robot to respond to the requested task by referring to the task library table 131. Further, the single-type task management program 141 can know the capability of the desired robot by referring to the robot state table 135. Then, the single-type task management program 141 can determine whether the desired robot can execute the requested task by comparing the capability necessary for the requested task and the capability of the desired robot with each other. When it is executable, the single-type task management program 141 then determines the responding method 13203. The responding method 13203 can be determined on the basis of whether the task response capability 13503 of the robot state table 135 satisfies the response capability requirement 13103 in the task library table 131, for example. If the task response capability 13503 of any one of the robots satisfies the response capability requirement 13103, that robot can respond to the task by itself. Thus, the responding method 13203 may only be the single response. If the response capability requirement 13103 is satisfied by combining the task response capabilities 113503 of a plurality of robots, the responding method 13203 may only be the coordination response.

(2) When the responding method 13203 determined in (1) is the single response, the single-type task management program 141 updates the received task table 132, the executing task state table 133, and the robot state table 135 with use of the trigger action configuration table 134 corresponding to the requested task so that the requested task is executed.

(3) When the responding method 13203 determined in (1) is the coordination response, the single-type task management program 141 transmits a coordination request message M2 to the coordination-type task management server MTS via the communication interface 15 so that the message is processed by the coordination-type task management server MTS. The coordination request message M2 is illustrated in FIG. 15. The coordination request message M2 stores therein a message identifier M201, a universal task number M202 of a requested task, and a request source ID M203.

The single-type task execution program 142 proceeds with the single-type task by stages in units of actions by causing the CPU 11 to mainly execute the following processing in a loop.

(1) The single-type task execution program 142 refers to the received task table 132. For the received task of which responding method 13203 is the single response, the single-type task execution program 142 scans the executing task state table 133 in units of rows. Then, the single-type task execution program 142 includes the current trigger determination expression 13302 in that row in a trigger determination request message M3 and transmits the trigger determination request message M3 to the trigger determination program 144 via the bus 12. The trigger determination request message M3 is illustrated in FIG. 16. The trigger determination request message M3 stores therein a message identifier M301, a trigger determination expression M302, a request source ID M303, and a request destination ID M304.

Figure 20:
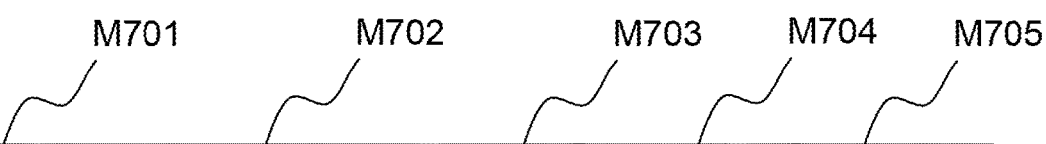
FIG. 20 is a diagram illustrating an action execution request message M7.

(2) A trigger determination result message M4 is returned in response to the trigger determination request message M3 of (1) from the trigger determination program 144 and the single-type task execution program 142 receives the trigger determination result message M4 via the bus 12. The trigger determination result message M4 is illustrated in FIG. 17. The trigger determination result message M4 stores therein a message identifier M401, a trigger determination result M402, a request source ID M403, and a request destination ID M404. If the trigger determination expression of (1) is satisfied, the single-type task execution program 142 includes the action corresponding to the trigger in an action execution request message M7 and transmits the action execution request message M7 to the action execution program 143 via the bus 12 so that the action is executed. The action execution request message M7 is illustrated in FIG. 20. The action execution request message M7 stores therein a message identifier M701, an action M702, a request source ID M703, a request destination ID M704, and a trigger number M705.

(3) If the action requested to be executed by the action execution program 143 is the last action in the trigger action configuration table 134, the single-type task execution program 142 deletes the corresponding row from the executing task state table 133 and migrates to the next row. If the action requested to be executed is not the last action, the single-type task execution program 142 updates the executing task state table 133, to thereby migrate to the next action in the trigger action configuration table 134 of this task.

When the trigger determination program 144 receives a request from the action execution program 143 or the coordination-type task execution program 242, the trigger determination program 144 determines the executability of the requested action and submits the determination result or the grounds for the determination to the source of the determination request by causing the CPU 11 to mainly execute the following processing.

(1) When the trigger determination program 144 receives the trigger determination request message M3 or a trigger calculation request message M5 from the single-type task execution program 142 or the coordination-type task execution program 242 via the communication interface 15 or the bus 12, the trigger determination program 144 identifies a function name and an argument from the character string of the trigger determination expression in the message and executes the function of the function name with use of the argument. The trigger calculation request message M5 is illustrated in FIG. 18. The trigger calculation request message M5 stores therein a message identifier M501, a trigger calculation expression M502, a request source ID M503, and a request destination ID M504.

(2) When the message received in (1) is the trigger determination request message M3 from the single-type task execution program 142, the trigger determination program 144 identifies the conditional expression from the character string for trigger determination and substitutes the return value of the function executed in (1) for the conditional expression. Then, the trigger determination program 144 includes the determination result of whether the conditional expression is satisfied in the trigger determination result message M4 and returns the trigger determination result message M4 to the single-type task execution program 142 via the bus 12.

Figure 19:
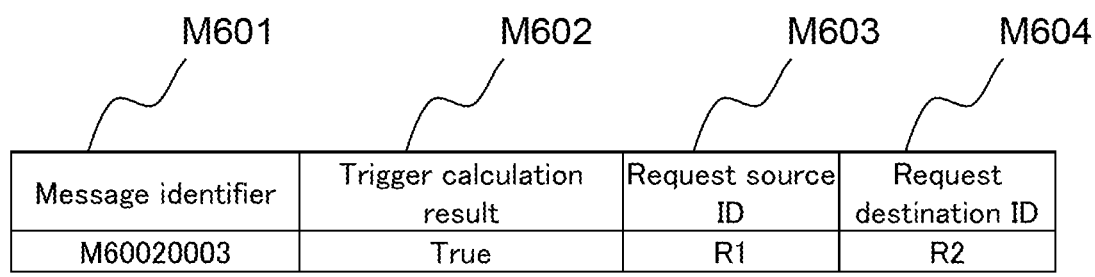
FIG. 19 is a diagram illustrating a trigger calculation result message M6.

(3) When the message received in (1) is the trigger calculation request message M5 from the coordination-type task execution program 242, the trigger determination program 144 configures the return value of the function executed in (1) as the trigger calculation result. Then, the trigger determination program 144 includes the trigger calculation result in a trigger calculation result message M6 and returns the trigger calculation result message M6 to the coordination-type task execution program 242 by the communication interface 15. The trigger calculation result message M6 is illustrated in FIG. 19. The trigger calculation result message 516 stores therein a message identifier M601, a trigger calculation result M602, a request source ID M603, and a request destination ID M604. The action execution program 143 causes the CPU 11 to mainly execute the following processing.

(1) When the action execution program 143 receives the action execution request message M7 from the single-type task execution program 142 or the coordination-type task execution program 242 via the communication interface 15 or the bus 12, the action execution program 143 identifies the function name and the argument from the character string of the action M702 in the message and executes the function of the function name with use of the argument.

(2) The action execution program 143 updates the robot state table 135 on the basis of the determination result of (1).

Figure 8:
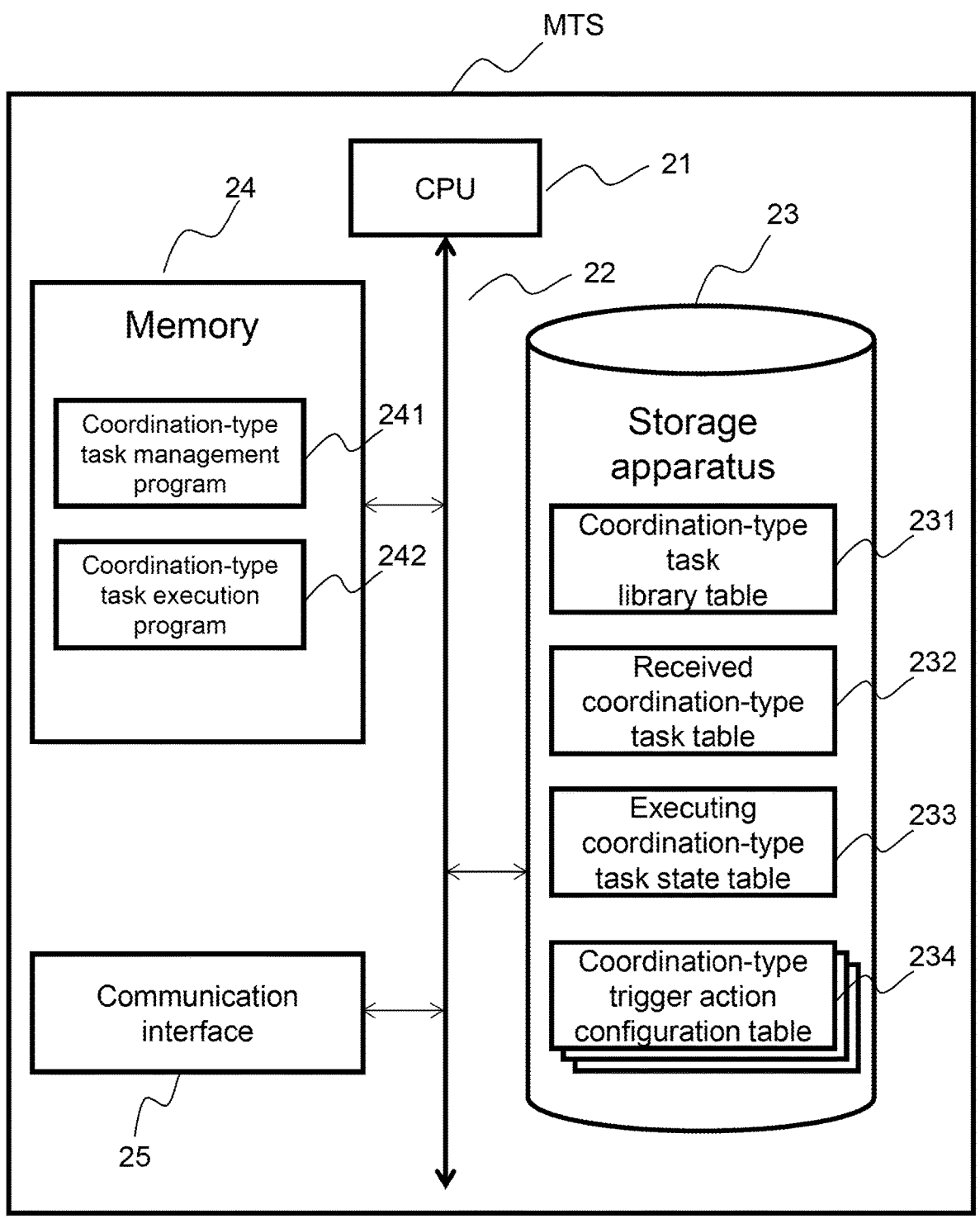
FIG. 8 is a block diagram illustrating a configuration of hardware and software of a coordination-type task management server MTS.

Description of the Configuration of the Coordination-Type Task Management Server MTS FIG. 8 is a block diagram illustrating a configuration of hardware and software of the coordination-type task management server MTS. The coordination-type task management server MTS includes a CPU 21 including a microprocessor. A storage apparatus 23 and a memory 24 are coupled to the CPU 21 via a bus 22. Further, a communication interface 25 is coupled to the CPU 21.

Under the control of the CPU 21, the communication interface 25 receives a message from the single-type task management server STS or the task configuration terminal TST in accordance with the communication protocol specified by the communication network NW. In addition, a message is transmitted to the single-type task management server STS. A TCP/IP is used as the communication protocol, for example.

The storage apparatus 23 stores therein a coordination-type task library table 231, a received coordination-type task table 232, an executing coordination-type task state table 233, and a coordination-type trigger action configuration table 234.

FIG. 9 is a configuration diagram of the coordination-type task library table 231. The coordination-type task library table 231 stores therein a universal task number 23101, a task name 23102, a coordination condition 23103, and a coordination-type trigger action configuration table location 23104 in association with each other. FIG. 9 illustrates an example of information to be stored in the coordination-type task library table 231. The universal task number 23101 is the same as the universal task number 13101 in the task library table 131. The coordination condition 23103 indicates the capabilities to be possessed by the robots to be in coordination with each other in the task. A method of determining the capabilities to be possessed by the robots to be in coordination with each other is to determine the capabilities so that all of action requirement capabilities 23406 in the corresponding coordination-type trigger action configuration table 234 are satisfied, for example. The coordination-type trigger action configuration table location 23104 indicates the save location of the coordination-type trigger action configuration table 234.

FIG. 10 is a configuration diagram of the received coordination-type task table 232. The received coordination-type task table 232 stores therein a task management number 23201, a universal task number 23202, and an involving robot ID 23203 in association with each other. FIG. 10 illustrates an example of information to be stored in the received coordination-type task table 232. The task management number 23201 in the received coordination-type task table 232 is a number obtained by the date of receiving the task, all the robot IDs 13502 involved in the task, and a four-digit serial number.

FIG. 11 is a configuration diagram of the coordination-type trigger action configuration table 234. The coordination-type trigger action configuration table 234 includes a plurality of table files for each task. Each table file is given the table file name 13401. Each table file stores therein a trigger number 23402, a trigger determination expression 23403, an action 23404, an involving robot 23405, an action requirement capability 23406, and an action parallel executability 23407 in association with each other. FIG. 11 illustrates an example of information to be stored in the coordination-type trigger action configuration table 234.

The table file of the coordination-type trigger action configuration table 234 is in one-to-one correspondence with the universal task number 23101 of the coordination-type task defined in the coordination-type task library table 231. Triggers for respectively causing a plurality of actions forming the coordination-type task are configured in the coordination-type trigger action configuration table 234. The plurality of actions forming the coordination-type task are executed by a plurality of robots in a shared manner. In the coordination-type trigger action configuration table 234, a robot to be involved in an action is configured as the involving robot 23405 for each action. A coordination source robot in the involving robot 23405 is the robot that has been executing the action when a certain robot takes over the place of another robot. A coordination destination robot is the robot taking over the execution of the subsequent actions when a certain robot takes over the place of another robot.

The action is a generic function executable by the action execution program 143 or a character string indicating the action included in the task included in the task library table 131. The trigger condition for causing the action is defined by the trigger determination expression 23403. The trigger determination expression 23403 is a Generic function having a return value executable by the trigger determination program 144 or a character string indicating a conditional expression using a task included in the task library table 131.

Unlike the determination expression in the trigger action configuration table 134, the determination expression in the coordination-type trigger action configuration table 234 may be a determination expression involving a plurality of robots. If the calculation result of the coordination-type trigger determination expression 23403 executed by the coordination-type task execution program 242 is true, the action 23404 is executed by the action execution program 143.

One trigger determination expression 23403 and the action 23404 corresponding thereto are linked to each other by the trigger number 23402 and are stored in one row of the coordination-type trigger action configuration table 234. The trigger number 23402 is a number indicating the first action, the last action, and the order of the actions when the plurality of actions 23404 are executed. For example, in the example of FIG. 11, the trigger number of the first action 23404 is 0 and the trigger number of the last action 23404 is −1. The actions 23404 beside those actions are given the trigger numbers 23402 that are serial numbers in the order of execution.

The involving robot 23405 indicates the robot involved in the determination of the trigger of the action and the execution of the action.

The action requirement capability 23406 is the capability required for the robot to execute the action. In order for a certain robot to execute the action, the capability of the robot (task response capability 13503) needs to include the action requirement capability 23406.

The action parallel executability 23407 indicates whether the action can be executed in parallel with other actions. When information needs to be handed over in the coordination of the robots, one row may only be added to the coordination-type trigger action configuration table 234 and an action of transmitting the information from the coordination source robot to the coordination destination robot may be designed as in FIG. 11.

As described herein, the allocation of the robot that executes the action can be configured for each action in the trigger action information (coordination-type trigger action configuration table 234). A coordination-type task execution unit (coordination-type task execution program 242) is configured to cause the action execution unit (action execution program 143) to execute each action included in the trigger action information with use of the robot allocated for the execution of the action in the trigger action information. The robot that executes the action can be configured for each action, and hence the task can be executed by a plurality of robots in coordination with each other.

FIG. 12 is a configuration diagram of the executing coordination-type task state table 233. A task management number 23301, a current trigger determination expression 23302, a current action 23303, a coordination-type trigger action configuration table location 23304, and a current trigger number 23305 are recorded in the executing coordination-type task state table 233 in association with each other. The executing coordination-type task state table 233 stores therein information indicating the state of the task that is being executed by a plurality of robots in coordination with each other. FIG. 12 illustrates an example of information to be stored in the executing coordination-type task state table 233. When the task formed of a plurality of actions is in execution, the task has a state in which part of the actions are processed as a current state. The current state of the task in execution is recorded in the executing coordination-type task state table 233.

The executing coordination-type task state table 233 is updated by the coordination-type task management program 241 and the coordination-type task execution program 242, and indicates the coordination-type task in execution and the progress of the coordination-type task.

Returning to FIG. 8, the memory 24 stores the coordination-type task management program 241 and the coordination-type task execution program 242 therein.

The coordination-type task management program 241 receives tasks and prepares execution by causing the CPU 21 to mainly execute the following processing.

(1) When the coordination-type task management program 241 receives the task coordination request message M2 via the communication interface 25, the coordination-type task management program 241 refers to the coordination-type task library table 231 and the robot state table 135 with use of the universal task number M202 and a request source ID R2 of the requested task in the coordination request message M2, and determines whether there is a robot that can respond to the requested task, that is, a robot that may become a coordination destination robot. As a method of determining whether there is a robot that may become a coordination destination robot, for example, a method of looking into whether there is a robot satisfying the coordination condition 23103 in the coordination-type task library table 231 in the robot state table 135 may be taken.

(2) When there is a robot that may become a coordination destination robot in (1), the coordination-type task management program 241 updates the received coordination-type task table 232, the executing coordination-type task state table 233, the robot state table 135, the executing task state table 133, and the received task table 132 with use of the coordination-type trigger action configuration table 234 corresponding to the requested task so that the requested task is executed.

(3) When it is determined that there are no coordination destination robots in (1), the coordination-type task management program 241 adds a default task to be executed when the coordination is refused in the executing task state table 133 and the received task table 132. The coordination-type task execution program 242 proceeds with the coordination-type task by stages in units of actions by causing the CPU 21 to mainly execute the following processing in a loop.

(1) The coordination-type task execution program 242 scans the executing coordination-type task state table 233 in units of rows. When the current trigger determination expression 23302 is acquired through the scanning, the current trigger determination expression 23302 is reflected in the trigger calculation request message M5 and the trigger calculation request message M5 is transmitted to the trigger determination program 144 via the communication interface 25.

(2) The trigger calculation result message M6 is returned in response to the trigger calculation request message M5 of (1) from the trigger determination program 144 and the coordination-type task execution program 242 receives the trigger calculation result message M6 via the communication interface 25. The coordination-type task execution program 242 determines whether the trigger determination expression 23302 of (1) is satisfied with use of the calculation result notified through the trigger calculation result message M6. If the trigger determination expression 23302 is satisfied, the coordination-type task execution program 242 includes an action corresponding to the trigger in the action execution request message M7 and transmits the action execution request message M7 to the action execution program 143 via the communication interface 25 so that the action is executed.

(3) If the action requested to be executed by the action execution program 143 is the last action in the coordination-type task, the coordination-type task execution program 242 deletes the rows of that coordination-type task from the executing coordination-type task state table 233 and the executing task state table 133 and migrates to the next row. If the action requested to be executed by the action execution program 143 is not the last action in the coordination-type task, the coordination-type task execution program 242 updates the rows of that coordination-type task in the executing coordination-type task state table 233 and the executing task state table 133 with use of the coordination-type trigger action configuration table 234 of that coordination-type task, and migrates to the next row.

Figure 13:
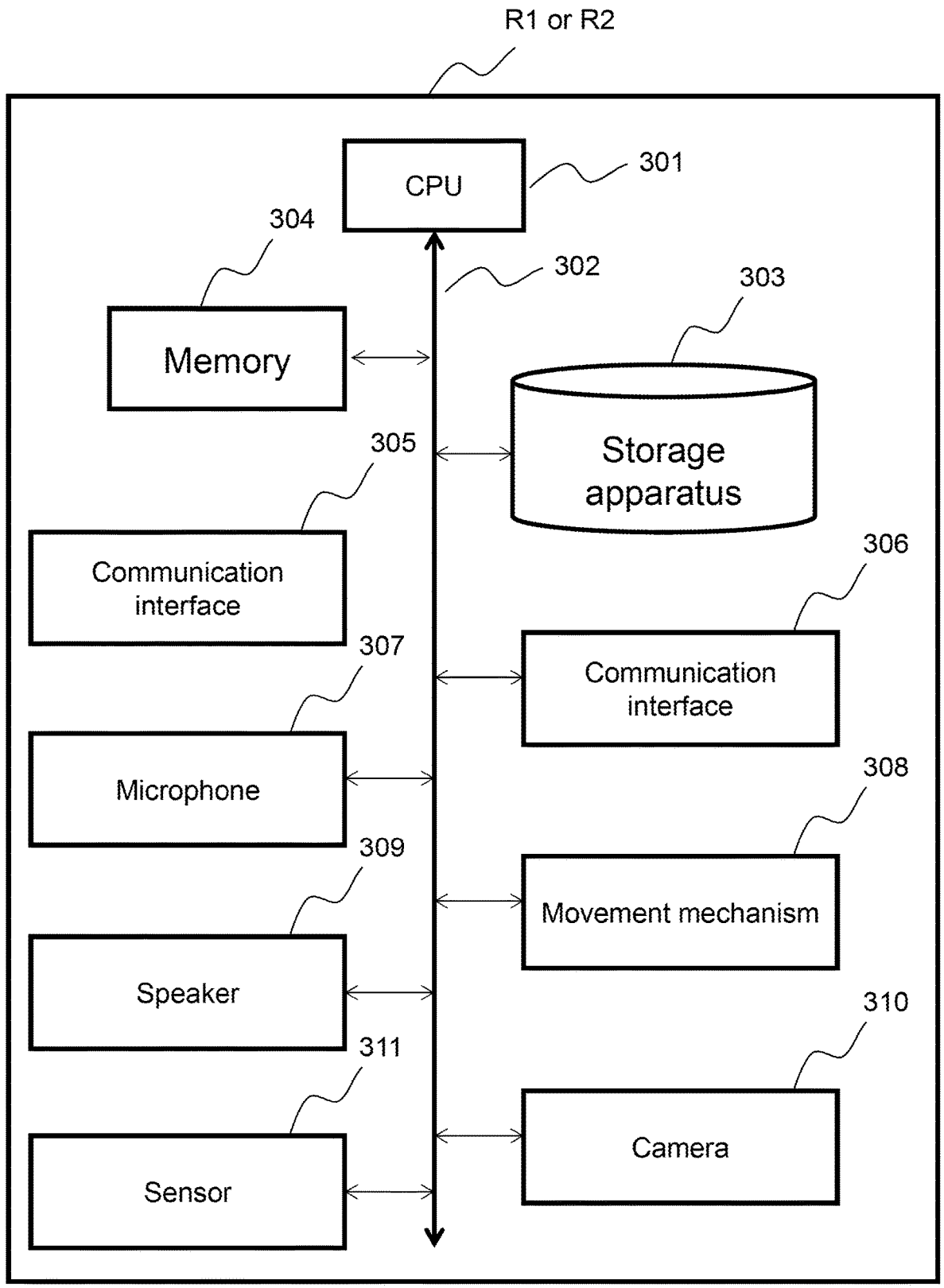
FIG. 13 is a block diagram illustrating an apparatus configuration of robots R1 and R2.

FIG. 13 is a block diagram illustrating an apparatus configuration of the robots R1 and R2. The robot R1 and the robot R2 have similar basic configurations, and each include a CPU 301 including a microprocessor. A storage apparatus 303, a memory 304, and a communication interface 305 are coupled to the CPU 301 via a bus 302. The robots R1 and R2 can also include apparatuses for achieving various kinds of capabilities, and can include various kinds of apparatuses such as a microphone 307, a movement mechanism 308, a speaker 309, a camera 310, or various kinds of sensors 311, for example. The robots R1 and R2 receive an execution command for determining the trigger of the execution of the action or an execution command of the action from the action execution program 143 or the trigger determination Program 144 of the single-type task management server STS or the coordination-type task management program 241 or the coordination-type task execution program 242 of the coordination-type task management server MTS via the communication interface 305 and execute the received execution command.

In each of the robots R1 and R2, a robot control application for controlling the mechanism, the posture, the movement, and the like of the robot itself and various kinds applications for realizing functions other than the control of the robot itself, for example, functions such as information gathering or position estimation performed by a sensor are stored in the memory 304 and the storage apparatus 303 and can be executed by the CPU 301.

Description of the Messages

The messages to be transmitted and received to and from apparatuses are described below. As described above, seven messages are used in this Embodiment. The messages to be used in this Embodiment include the task initial processing request message M1, the coordination request message M2, the trigger determination request message M3, the trigger determination result message M4, the trigger calculation request message M5, the trigger calculation result message M6, and the action execution request message M7. Those messages are messages specified in an application layer. Information to be included in a payload of the message is mainly described here. Encapsulation for transmitting and receiving the information as payload data may differ depending on the communication method.

FIG. 14 is a diagram illustrating the task initial processing request message M1. Task initial processing is processing of allocating a task requested to be executed (requested task) for a robot and causing the task to be received. The task initial processing request message M1 is a message for requesting the task initial processing. The task initial processing request message M1 stores therein the message identifier M101, the universal task number 102 of the requested task, the robot ID M103 of the desired robot, and the request source ID M104. The request source ID M104 and the robot ID M103 of the desired robot are sometimes the same. This is a case in which the robot serving as the request source is requesting the task initial processing of itself. FIG. 14 illustrates an example of information to be stored in the task initial processing request message M1.

The message identifier M101 indicates the type of the message and the question and answer relationship of the message. For example, in this Embodiment, the character "M" at the beginning and the subsequent upper two digits of the message identifier M101 indicate the message type by a combination of alphabetical letters and numbers, and the subsequent six digits are an identification information (ID) indicating the relationship between the messages. Messages in a question and answer relationship with each other have the same six-digit identification information (ID). The message identifiers in the other six messages described later also indicate the type of the message and the question and answer relationship of the message as with the message identifier M101.

The universal task number M102 of the requested task is an identification number for uniquely identifying the task requested to be executed (requested task).

The robot ID M103 of the desired robot is a robot ID of a robot that is the target of the task initial processing. The task initial processing is processing of allocating the task requested to be executed (requested task) for a robot and causing the task to be received.

The request source ID M104 is a robot ID of a robot serving as the request source of the task initial processing.

FIG. 15 is a diagram illustrating the coordination request message M2. The coordination request message M2 is a message for requesting the coordination response. The coordination request is processing performed as necessary in response to the request of the task initial processing. The coordination request message M2 is in a question and answer relationship with the task initial processing request message M1. The coordination request message M2 stores therein the message identifier M201, the universal task number M202 of the requested task, and the request source ID M203. FIG. 15 illustrates an example of information to be stored in the coordination request message M2. The message identifier M201 indicates the type of the message and the question and answer relationship of the message as with the message identifier M101.

The universal task number M202 of the requested task is an identification number indicating the requested task for requesting the coordination response.

The request source ID M203 is a robot ID of a robot serving as the coordination source of the coordination response of the requested task.

FIG. 16 is a diagram illustrating the trigger determination request message M3. A trigger determination request is a message for requesting the determination of whether the trigger condition is satisfied in the single response, that is, whether the trigger determination expression is true or false when a single robot executes the actions of the requested task. The trigger determination request message M3 stores therein the message identifier M301, the trigger determination expression M302, the request source ID M303, and the request destination ID M304. FIG. 16 illustrates an example of information to be stored in the trigger determination request message M3.

The message identifier M301 indicates the type of the message and the question and answer relationship of the message as with the message identifier M101.

The trigger determination expression M302 indicates the determination expression (trigger determination expression) for requesting the determination in the single response.

The request source ID M303 is a robot ID of a robot that is on the side that requests the trigger determination, that is, a robot ID of a robot that has executed the action before the action that is the target of the trigger determination.

The request destination ID M304 is a robot ID of a robot on the side that is requested to perform the trigger determination, that is, a robot ID of a robot that executes the action that is the target of the trigger determination.

FIG. 17 is a diagram illustrating the trigger determination result message M4. The trigger determination result message M4 is a message for notifying a receiver of the message of whether the result of the trigger determination is true or false. The trigger determination result message M4 is in a question and answer relationship with the trigger determination request message M3. The trigger determination result message M4 stores therein the message identifier M401, the trigger determination result M402, the request source ID M403, and the request destination ID M404. FIG. 17 illustrates an example of information to be stored in the trigger determination result message M4.

The message identifier M401 indicates the type of the message and the question and answer relationship of the message as with the message identifier M101.

The trigger determination result M402 indicates whether the result of the trigger determination is true or false.

The request source ID M403 is a robot ID of a robot that is on the side that requests the trigger determination, that is, a robot ID of a robot that has executed the action before the action that is the target of the trigger determination.

The request destination ID M404 is a robot ID of a robot on the side that is requested to perform the trigger determination, that is, a robot ID of a robot that executes the action that is the target of the trigger determination.

FIG. 18 is a diagram illustrating the trigger calculation request message M5. A trigger calculation request is a message for requesting the determination of whether the trigger condition is satisfied in the coordination response, that is, whether the trigger determination expression is true or false when the action of the requested task is executed by a plurality of robots in coordination with each other. The trigger calculation request message M5 stores therein the message identifier M501, the trigger calculation expression, the request source ID M503, and the request destination ID M504. FIG. 18 illustrates an example of information to be stored in the trigger calculation request message M5.

The message identifier M501 indicates the type of the message and the question and answer relationship of the message as with the message identifier M101.

The trigger calculation expression M502 indicates a determination expression (trigger calculation expression) for requesting the determination in the coordination response.

The request source ID M503 is a robot ID of a robot that is on the side that requests the trigger determination, that is, a robot ID of a robot that has executed the action before the action that is the target of the trigger determination.

The request destination ID M504 is a robot ID of a robot on the side that is requested to perform the trigger determination, that is, a robot ID of a robot that executes the action that is the target of the trigger determination.

FIG. 19 is a diagram illustrating the trigger calculation result message M6. The trigger calculation result message M6 is a message for notifying a receiver of the message of whether the result of the trigger determination is true or false. The trigger calculation result message M6 is in a question and answer relationship with the trigger calculation request message M5. The trigger calculation result message M6 stores therein the message identifier M601, the trigger calculation result M602, the request source ID M603, and the request destination ID M604. FIG. 19 illustrates an example of information to be stored in the trigger calculation result message M6.

The message identifier M601 indicates the type of the message and the question and answer relationship of the message as with the message identifier M101.

The trigger calculation result M602 indicates whether the result of the trigger determination is true or false.

The request source ID M603 is a robot ID of a robot that is on the side that requests the trigger determination, that is, a robot ID of a robot that has executed the action before the action that is the target of the trigger determination.

The request destination ID M604 is a robot ID of a robot on the side that is requested to perform the trigger determination, that is, a robot ID of a robot that executes the action that is the target of the trigger determination.

FIG. 20 is a diagram illustrating the action execution request message M7. The action execution request message M7 is a message for requesting the execution of an action corresponding to the trigger determination expression or the trigger calculation expression when the trigger determination is true. The action execution request message M7 stores therein the message identifier M701, the action M702, the request source ID M703, the request destination ID M704, and the trigger number M705. FIG. 20 illustrates an example of information to be stored in the action execution request message M7. The message identifier M701 indicates the type of the message and the question and answer relationship of the message as with the message identifier M101.

The action M702 indicates an action for requesting the execution. The request source ID M703 is a robot ID of a robot that is on the side that requests the trigger determination, that is, a robot ID of a robot that has executed the action before the action that is the target of the trigger determination.

The request destination ID M704 is a robot ID of a robot on the side that is requested to perform the trigger determination, that is, a robot ID of a robot that executes the action that is the target of the trigger determination.

The trigger number M705 indicates a trigger number corresponding to the action for requesting the execution. The trigger number is a number given to an action in the trigger action configuration table 134 or the coordination-type trigger action configuration table 234. How far the task has progressed can be known from the trigger number M705.

Description of the System Operation

Next, the operation of various kinds of processing of the service robot system configured as above is described below. Here, a form in which a task t is executed by one robot is referred to as "single form ts", and a form in which the task t is executed by a plurality of robots is referred to as "coordination form tm". The single form ts and the coordination form tm are each defined by a series of actions and triggers for causing those actions.

Pre-configuration of the robot for the execution of the task (for example, the task t)

When the system does not include the trigger action configuration table 134 corresponding to the single form ts or the coordination-type trigger action configuration table 234 corresponding to the coordination form tm for the task t to be executed, the trigger action configuration table 134 or the coordination-type trigger action configuration table 234 is added by the following method, for example, in the service robot system in this Embodiment.

First, a method of configuring the task and the action in the single form ts is described.

First, the entity managing the robot, for example, the manager uses the task configuration terminal TST coupled to the network NW, to thereby access the single-type task management server STS coupled to the same network NW via the communication interface 15. Then, the manager adds a table file defining the single form ts individually corresponding to the task t to be executed to the trigger action configuration table 134 of the storage apparatus 13 of the single-type task management server STS. When the table file is added to the trigger action configuration table 134, the manager then adds one new row to the task library table 131 in the storage apparatus 13 and writes the universal task number 13101, the task name 13102, the response capability requirement 13103, the other task parallel executability 13104, and the trigger action configuration table location 13105 of the task t in that row.

Next, a method of configuring the task and the action in the coordination form ts is described.

The manager uses the task configuration terminal TST, to thereby access the coordination-type task management server MTS by a method similar to the method of accessing the single-type task management server STS. Then, the manager adds a table file defining the coordination form tm to the coordination-type trigger action configuration table 234 in the storage apparatus 23 of the coordination-type task management server MTS. When the table file is added to the coordination-type trigger action configuration table 234, the manager then adds one new row to the coordination-type task library table 231 in the storage apparatus 23 and writes the universal task number 23101, the task name 23102, the coordination condition 23103, and the coordination-type trigger action configuration table location 23104 of the task t in that row.

The addition of the task is described herein, but the deletion of the task can be performed as well.

When there is the trigger action configuration table 134 corresponding to the single form ts or the coordination-type trigger action configuration table 234 corresponding to the coordination form tm for the task t to be executed but the update thereof is necessary, the trigger action configuration table 134 or the coordination-type trigger action configuration table 234 is updated by the following method, for example, in the service robot system in this Embodiment. The update of the trigger action configuration table 134 or the coordination-type trigger action configuration table 234 means to correct a row in the table or to edit a part of the row, for example. The manager accesses the single-type task management server STS with use of the task configuration terminal TST. Then, the manager updates a table file corresponding to the single form ts of the task t in the trigger action configuration table 134 in the storage apparatus 13 of the single-type task management server STS. The manager can update a table file corresponding to the coordination form tm of the task t in the coordination-type trigger action configuration table 234 in the storage apparatus 23 of the coordination-type task management server MTS by a method similar to the method of updating the table file in the single form is of the trigger action configuration table 134.

Therefore, the entity managing the robot, for example, the system manager can flexibly configure the form of the tasks, for example, the content of the action or the condition for executing the action by the addition, the update, the deletion of the table files of the trigger action configuration table 134 and the coordination-type trigger action configuration table 234, and the robot can provide appropriate services in accordance with the location or the condition. How a robot executes "task_greet_single form" is described below with use of the example of the trigger action configuration table 134 illustrated in FIG. 5. A task of greeting a person approaching a single robot is specified in the table.

In FIG. 5, the trigger determination expression of the first row of which trigger number is 0 is "function_person approach detection (function execution robot ID, 10 meters)=detection". The expression "function_person approach detection ( )" is a function in the trigger determination program 144 and is a trigger determination expression for detecting that a person is approaching. The first argument "function execution robot ID" indicates the robot ID of the robot that executes the determination and the second argument "10 meters" is a threshold value of a distance for determining that a person is approaching. When a person is within 10 meters of the robot, the value of the function becomes true. When the threshold value is "10 meters" in a crowded location, there is a fear that people not to be greeted are increasingly misdetected and the success rate of correctly detecting the approach of people to be greeted may decrease. In that case, the entity managing the robot, for example, the manager may only change the argument to a shorter distance such as "6 meters". When the trigger determination expression is determined by the trigger determination program 144 to be "true", the trigger determination program 144 returns a response that the trigger determination expression is true to the single-type task execution program 142. When the single-type task execution program 142 receives the response that the trigger determination expression is true, the single-type task execution program 142 causes the action execution program 143 to execute an action "function_target lock (function execution robot ID)".

The expression "function_target lock ( )" is a function name of a function included in the action execution program 143. The argument "function execution robot ID" is the robot ID of the robot that executes the function. Specifically, this action is an action in which a robot that has determined that there is a possibility that a person is approaching the robot locks that person as the target of the personal service. Specifically, processing of locking the person as the target is processing of recognizing a face of a person, for example.

Next, the processing migrates to the row of which trigger number is 1. The trigger determination expression of this row is "true", that is, always true, and hence the single-type task execution program 142 automatically causes the action execution program 143 to execute "function_face orientation adjustment (function execution robot ID)" of this row after the action of target lock is performed. As a result, the robot directs the face thereof to the person (client) that is the target of the personal service and looks into the eyes of the client.

Next, the processing migrates to the row of which trigger number is 2. The trigger determination expression of this row is "function_distance determination (function execution robot ID, target coordinate)<=5 meters". In the trigger determination expression, the distance between the locked target and the robot is measured and is compared with a threshold value. When the distance becomes equal to or smaller than 5 meters, it is determined that the trigger determination expression is "true". This determination means that there is a high possibility that the person locked as the target is seeking some kind of service from the robot. In that case, "function_body orientation adjustment (function execution robot ID)" is executed and the robot directs the body thereof to the person that is the target. When the distance is "5 meters" in a crowded location, there is a fear that the detection of whether the person that is the target is seeking some kind of service from the robot cannot be correctly performed and the success rate may decrease. In that case, the entity managing the robot, for example, the manager may only change the argument serving as the threshold value to a shorter distance such as "2 meters", for example.

Next, the processing migrates to the last row of which trigger number is −1. The trigger determination expression of "function_main detect (function execution robot ID)==detection" is a determination expression for determining that the person that is the target of service is certainly seeking some kind of service from the robot when the determination expression is "true". When the trigger determination expression is true, the action execution program 143 is caused to execute "function_greet (function execution robot ID)". As a result, the robot greets the person that is the target. For example, the robot asks the person, "hello, how can I help you?" An operation in which the single-type task management server STS causes the robot to execute a task, for example, the task t is described.

When the single-type task management program 141 receives a request for requesting the execution of the task t, the single-type task management program 141 executes the task initial processing.

Figure 21:
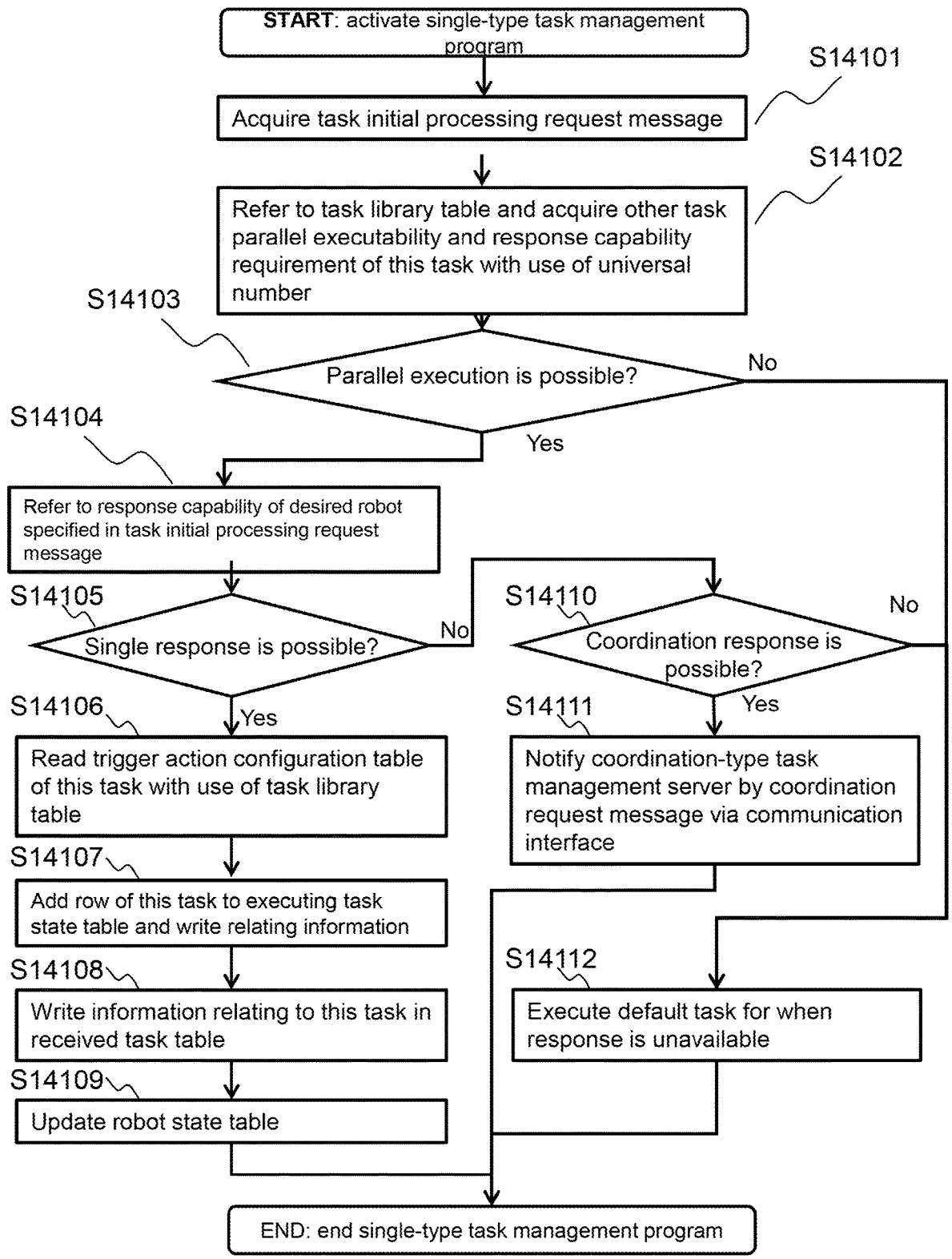
FIG. 21 is a flow chart of single-type task initial processing.

FIG. 21 is a flow chart of single-type task initial processing. The single-type task management program 141 receives the task initial processing request message M1 via the communication interface 15 or the bus 12 in Step S14101. There may be a possibility that the transmission source of the task initial processing request message M1 is at least the action execution program 143, the trigger determination program 144, or the task configuration terminal TST. The single-type task management program 141 can check whether the message is the task initial processing request message M1 by checking the message identifier M101 of the message.

Next, the single-type task management program 141 decodes the task initial processing request message M1 and acquires the universal task number M102 of the requested task that is the task requested to be executed and the robot ID M103 of the desired robot that is the robot desired to execute the requested task in Step S14102.

The single-type task management program 141 refers to the task library table 131 via the bus 12, and acquires the task name 13102, the response capability requirement 13103, and the other task parallel executability 13104 of the task corresponding to the requested task with use of the acquired universal task number M102.

If the information of the other task parallel executability 13104 is "no", the single-type task management program 141 refers to the task management number 13301 of the executing task state table 133 and checks whether the desired robot is currently executing the task in Step S14103. If the desired robot is executing the task, the single-type task management program 141 determines that the desired robot is currently in a state of not being able to execute the task t and causes the action execution program 143 to execute the default task to be executed when the response is unavailable in Step S14112. If the desired robot is not executing the task, the single-type task management program 141 determines that the task t can be executed and migrates to Step S14104.

When the processing migrates to Step S14104, the single-type task management program 141 acquires the task response capability 13503 of the desired robot from the robot state table 135 with use of the robot ID M103 of the desired robot in the task initial processing request message M1. Next, in Step S14105, the single-type task management program 141 compares the response capability requirement 13103 (excluding the capability indicated by "(optional)") of the task t acquired in Step S14102 and the task response capability 13503 of the desired robot, and determines whether the desired robot can respond to the task t by itself. The capability that is optional in the response capability requirement 13103 is a capability needed in an omittable action. The optional capability is excluded here because the desired robot can respond to the requested task by itself even if the desired robot does not have that capability.

The processing migrates to Step S14106 if the single-type task management program 141 determines that the desired robot can respond to the task t by itself, and the processing migrates to Step S14110 if the single-type task management program 141 determines that the desired robot cannot respond to the task t by itself. In Step S14110, the single-type task management program 141 determines whether the task t can be responded to by robots in coordination with each other. If the task t can be responded to by robots in coordination with each other, the single-type task management program 141 transmits the coordination request message M2 to the coordination-type task management server MTS via the communication interface 15 in Step S14111 in order to request the coordination response of the requested task. If the task t cannot be responded to by robots in coordination with each other, the single-type task management program 141 migrates the processing to Step S14112.

When the processing migrates to Step S14106, the single-type task management program 141 acquires the trigger action configuration table location 13105 corresponding to the single form is of the task t with use of the acquired universal task number 13101, and reads the first row of the trigger action configuration table 134 from the indicated location. In Step S14107, the single-type task management program 141 changes the task t to a task in execution by adding a row of the task t to the executing task state table 133 and writes the information relating to the task t in that row. Next, in Step S14108, the single-type task management program 141 changes the task t to a received task by adding a row of the task t also to the received task table 132 and writes the information relating to the task t also in that row.

Lastly, in Step S14109, the single-type task management program 141 refers to the robot ID of the robot state table 135, to thereby identify the information indicating the state of the desired robot, and updates the task management number 13504 of the current task of the desired robot to a number indicating the task t.

As described herein, a task management unit (the single-type task management program 141 on the memory 14) manages the execution of the task. The storage apparatus 13 stores therein task library information (task library table 131) for specifying, for each task, whether the task is a task that can be executed in parallel with other tasks. The task management unit (single-type task management program 141) is configured to refer to the task library information when the execution of the task is requested, cause the task execution unit (single-type task execution program 142) to start the execution of the task regardless of whether other tasks are being executed as long as the task can be executed in parallel with other tasks, check whether other tasks are being executed if the task cannot be executed in parallel with other tasks, and cause the task execution unit to execute the task after other tasks have ended if other tasks are being executed. If the task can be executed in parallel with other tasks, the task can be started at an early stage, and hence the provision of the personal service can progress in a rapid manner.

Further, a coordination-type task management unit (coordination-type task management program 241) is configured to configure an action included in a task and a robot to be used in the execution of the action on the basis of a required capability required for each action included in the task. The actions included in the task can be allocated for a plurality of robots in accordance with the required capability thereof, and hence a plurality of robots having different capabilities can be combined to be effectively used and tasks that need various capabilities can be efficiently executed.

The coordination-type task management unit (coordination-type task management program 241) is configured to look into whether there is a robot including a required capability required for all the actions included in the task and preferentially allocate, if there is a robot having the required capability, the robot for the action included in the task. If there is a robot that can cover all the actions included in the task, that robot is preferentially used to execute all the actions by one robot, and hence the task can be efficiently executed.

However, as illustrated in FIG. 5, the omittable action of which execution can be omitted may be included in the actions included in the task. The coordination-type task management unit is configured to look into whether there is a robot having an essential required capability that is a required capability required for all actions other than the omittable action included in the task if there are no robots including the required capability required for all the actions included in the task, and preferentially allocate, if there is a robot that does not necessarily have an optional required capability but has the essential required capability, the robot for the action included in the task. When the actions included in the task other than the omittable actions can be executed by one robot, the robot can be caused to execute the task, and hence the resources of the robots can be effectively used. The coordination-type task management unit is configured to determine, if an action of which required capability cannot be satisfied by any robot is an omittable action, the omission of the omittable action. When there is a robot satisfying the actions included in the task other than the omittable actions, the omittable actions can be omitted and the execution of the task can be ensured.

Single-type task execution processing in which the single-type task execution program 142 proceeds with the task t by stages in units of actions is described.

Figure 22:
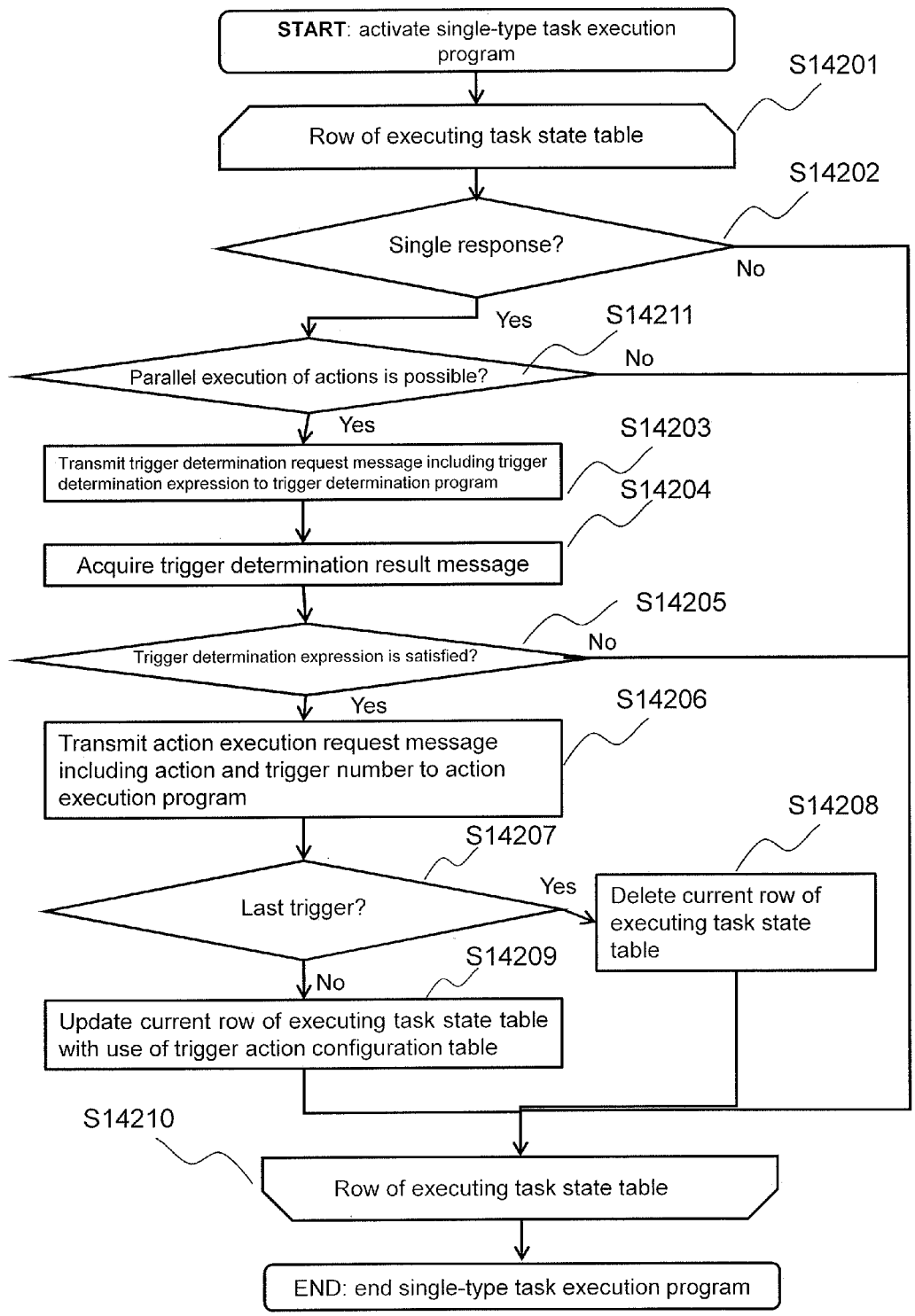
FIG. 22 is a flow chart of single-type task execution processing.

FIG. 22 is a flowchart of the single-type task execution processing. In Step S14201, the single-type task execution program 142 scans the executing task state table 133 in units of rows and repeats the following processing.

In Step S14202, the single-type task execution program 142 refers to the received task table 132 with use of the task management number 13301 of the executing task state table 133 and checks the responding method 13203 of the scanned task.

If the responding method 13203 of the task t is a coordination response, the single-type task execution program 142 migrates to Step S14210. If the responding method 13203 of the task t is a single response, the single-type task execution program 142 migrates to Step S14211. In Step S14211, the single-type task execution program 142 determines whether the task executed by the robot executing the task can be executed in parallel with other tasks. When the robot are executing a plurality of tasks in parallel with each other, the single-type task execution program 142 determines whether the action to be executed next in the task can be executed in parallel with the actions of all the other tasks currently executed by the robot.

If the parallel execution is not possible, the single-type task execution program 142 migrates to Step S14210. If the parallel execution is possible, the single-type task execution program 142 migrates to Step S14203.

In Step S14203, the single-type task execution program 142 reads the current trigger determination expression 23302 of the corresponding row. Then, the single-type task execution program 142 includes that trigger determination expression 23302 in the trigger determination request message M3 and transmits the trigger determination request message M3 to the trigger determination program 144 via the bus 12. The trigger determination request message M3 receives the trigger determination result message M4 and checks the message identifier M401 in the trigger determination result message M4 in Step S14204. For example, if the trigger determination result message M4 is a response to the trigger determination request message M3, the message identifiers included in those two messages match with each other. Next, the single-type task execution program 142 reads the trigger determination result and checks whether the trigger determination expression M302 is satisfied in Step S14205. If the trigger determination expression M302 is not satisfied, the single-type task execution program 142 does not execute the action corresponding to the trigger and migrates to Step S14210. If the trigger determination expression M302 is satisfied, the single-type task execution program 142 executes the action corresponding to the trigger, and hence migrates to Step S14206.

In Step S14206, the single-type task execution program 142 transmits the action execution request message M7 including the action and the trigger number M705 of the corresponding row to the action execution program 143.

Subsequently, the single-type task execution program 142 checks whether the action executed in Step S14206 is the last action of the task in Step S14207. In this Embodiment, one checking method is to check whether the trigger number M705 is the last number.

If the executed action is the last action, the single-type task execution program 142 deletes the current row of the executing task state table 133 in Step S14208 and migrates to Step S14210.

If the executed action is not the last action, the single-type task execution program 142 migrates to Step S14209. In Step S14209, the single-type task execution program 142 refers to the trigger action configuration table 134 and updates the current row of the executing task state table 144 with use of information corresponding to the next action 13404 of the executed action.

If the next action cannot be executed by the robot due to the action requirement capability thereof, the action is skipped and the current row of the executing task state table 144 is updated with use of information corresponding to the action after the next.

Whether the next action can be executed by the robot in terms of the action requirement capability thereof is understood by referring to the task response capability 13503.

Lastly, the single-type task execution program 142 migrates to Step S14210.

As described above, the single-type task execution program 142 causes the trigger determination program 144 to determine whether the trigger determination expression M302 is satisfied and determines the executability of the action on the basis of the determination result. Description is made in detail later, but the coordination-type task execution program 242 also causes the trigger determination program 144 to calculate the trigger determination expression M302 and determines the executability of the action on the basis of the calculation result.

As described here, information of whether the action can be executed in parallel with other actions is configured in the trigger action information (trigger action configuration table 134). The task execution unit (single-type task execution program 142) causes the trigger determination unit (trigger determination program 144) to determine whether the trigger condition of the selected action is satisfied during execution of a preceding action if the selected action can be executed in parallel with other actions, and causes the trigger determination unit to determine whether the trigger condition of the selected action is satisfied after the preceding action has ended if the selected action cannot be executed in parallel with other actions. If the action can be executed in parallel with other actions, the action can be started at an early stage and the series of actions can progress in a rapid manner.

Trigger determination processing performed by the trigger determination program 144 that is in both of the above-mentioned determinations is described here.

Figure 23:
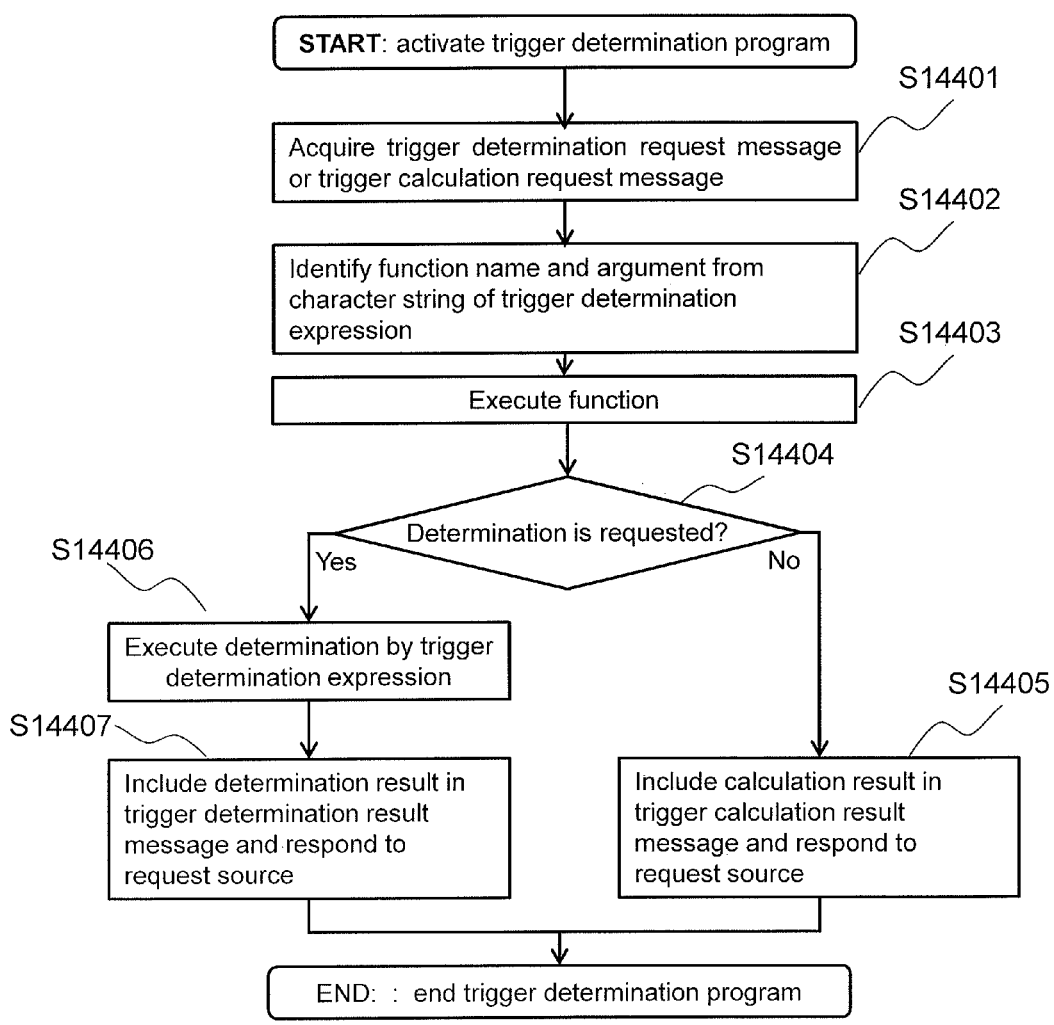
FIG. 23 is a flow chart of trigger determination processing.

FIG. 23 is a flow chart of the trigger determination processing. The trigger determination processing starts when the trigger determination program 144 receives the trigger determination request message M3 or the trigger calculation request message M5 via the bus 12 or the communication interface 15 in Step S14401. Subsequently, the trigger determination program 144 identifies the function name and the argument from the character string of the trigger determination expression M302 in the received message in Step S14402. The trigger determination program 144 executes the function in Step S14403.

Then, the trigger determination program 144 determines the type of the received message with use of the message identifier M401 of the received message in Step S14404. If the received message is the trigger calculation request message M5, the trigger determination program 144 migrates to Step S14405. Then, the trigger determination program 144 includes the return value of the executed function in the trigger calculation result message M6 and transmits the trigger calculation result message M6 to the coordination-type task execution program 242 via the communication interface 15.

If the received message is the trigger determination request message M3, the trigger determination program 144 migrates to Step S14406. Then, the trigger determination program 144 identifies the conditional expression from the character string of the current trigger determination expression 23302 and substitutes the return value of the executed function for the conditional expression, to thereby perform truth/false determination.

Figure 24:
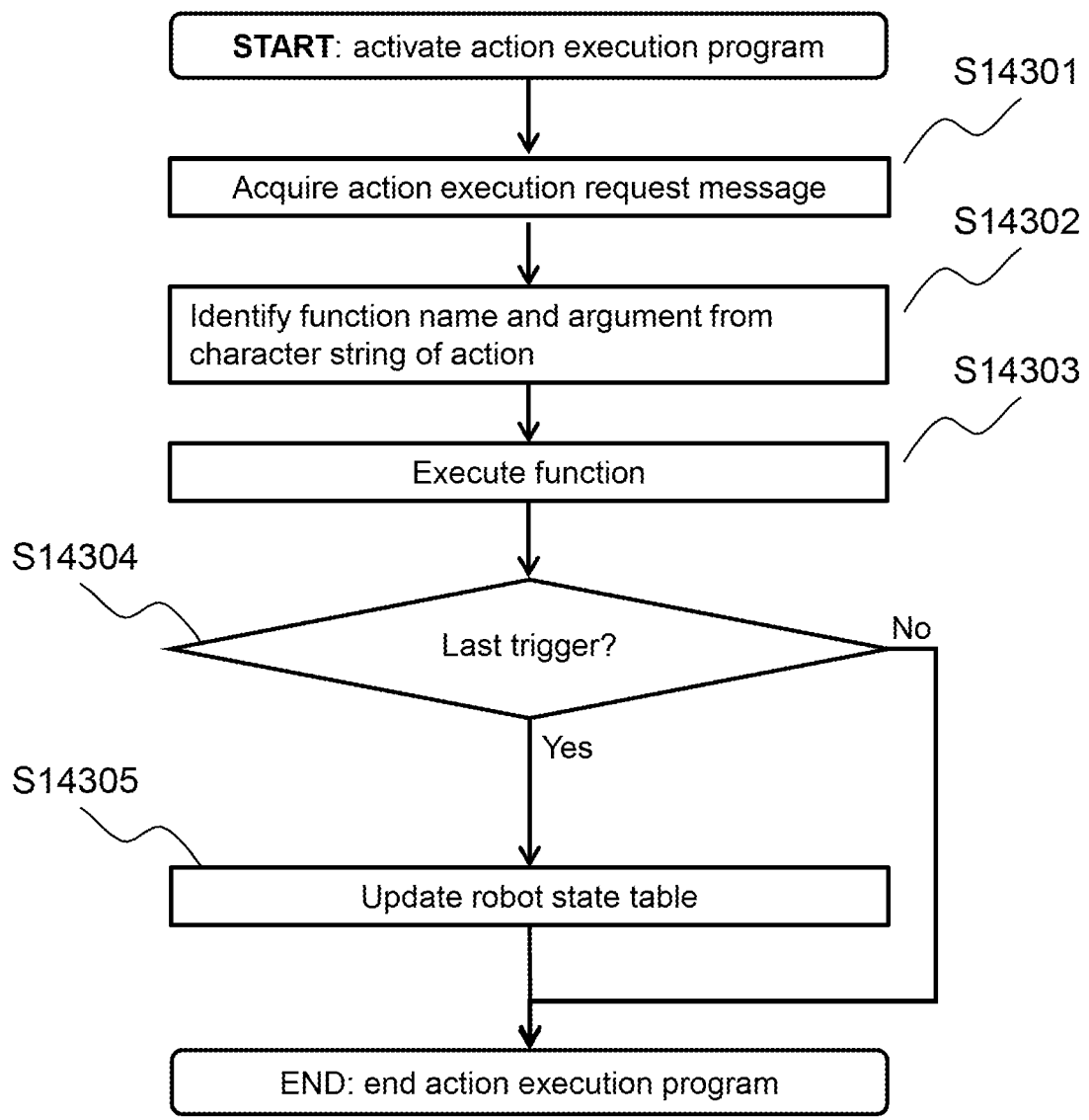
FIG. 24 is a flow chart of action execution processing.

Then, in Step S14407, the trigger determination program 144 includes the result of the determination in the trigger determination result message M4 and returns the trigger determination result message M4 to the single-type task execution program 142 via the bus 12. As described above, if the trigger determination expression M302 is satisfied, the single-type task execution program 142 causes the action execution program 143 to execute the action. Further, as described later in detail, if the trigger determination expression is satisfied, the coordination-type task execution program 242 also causes the action execution program 143 to execute the action. The action execution program 143 executes the action by action execution processing by a request from the single-type task execution program 142 or the coordination-type task execution program 242. FIG. 24 is a flow chart of the action execution processing.

When the action execution program 143 receives the action execution request message M7 via the bus 12 or the communication interface 15 in Step S14301, the action execution program 143 starts the action execution processing.

Subsequently, the action execution program 143 identifies the function name and the argument from the character string of the action M702 in the received message in Step S14302 and executes the function in Step S14303.

Next, the action execution program 143 checks whether the action executed in Step S14303 is the last action of the task in Step S14304. In this Embodiment, the action execution program 143 checks whether the current trigger number 13305 is the last number as one method of checking whether the action is the last action. If the executed action is not the last action, the action execution program 143 ends the processing.

If the executed action is the last action, the action execution program 143 migrates to Step S14305. In Step S14305, the action execution program 143 accesses the storage apparatus 13 via the bus 12 with use of the request source ID M703 of the received action execution request message M7 and deletes the task management number 13504 of the current task from the robot state table 135.

The action can activate other tasks. For example, one action included in the single form is of the task t is a function for causing another task to be executed. This function has a versatility for activating the task and has a feature of generating the task initial processing request message M1 on the basis of the argument and transmitting the task initial processing request message M1 to the single-type task management program 141, for example.

In order to activate the task t to a task q, the action execution program 143 uses the function as the action, to thereby generate the task initial processing request message M1 and transmit the task initial processing request message M1 to the single-type task management program 141.

When the single-type task management program 141 that has received the task initial processing request message M1 determines to respond to the task q by the coordination response, the task q is processed by the coordination-type task management server MTS. Therefore, the task in the single form can activate the task in the coordination form. In that case, the task q that is the coordination-type and the task t that is single-type may be tasks having the same contents. The operation in which the coordination-type task management server MTS causes the robot to execute the task is described.

When the coordination-type task management program 241 receives a request for executing the task, the coordination-type task management program 241 executes the task initial processing.

Figure 25:
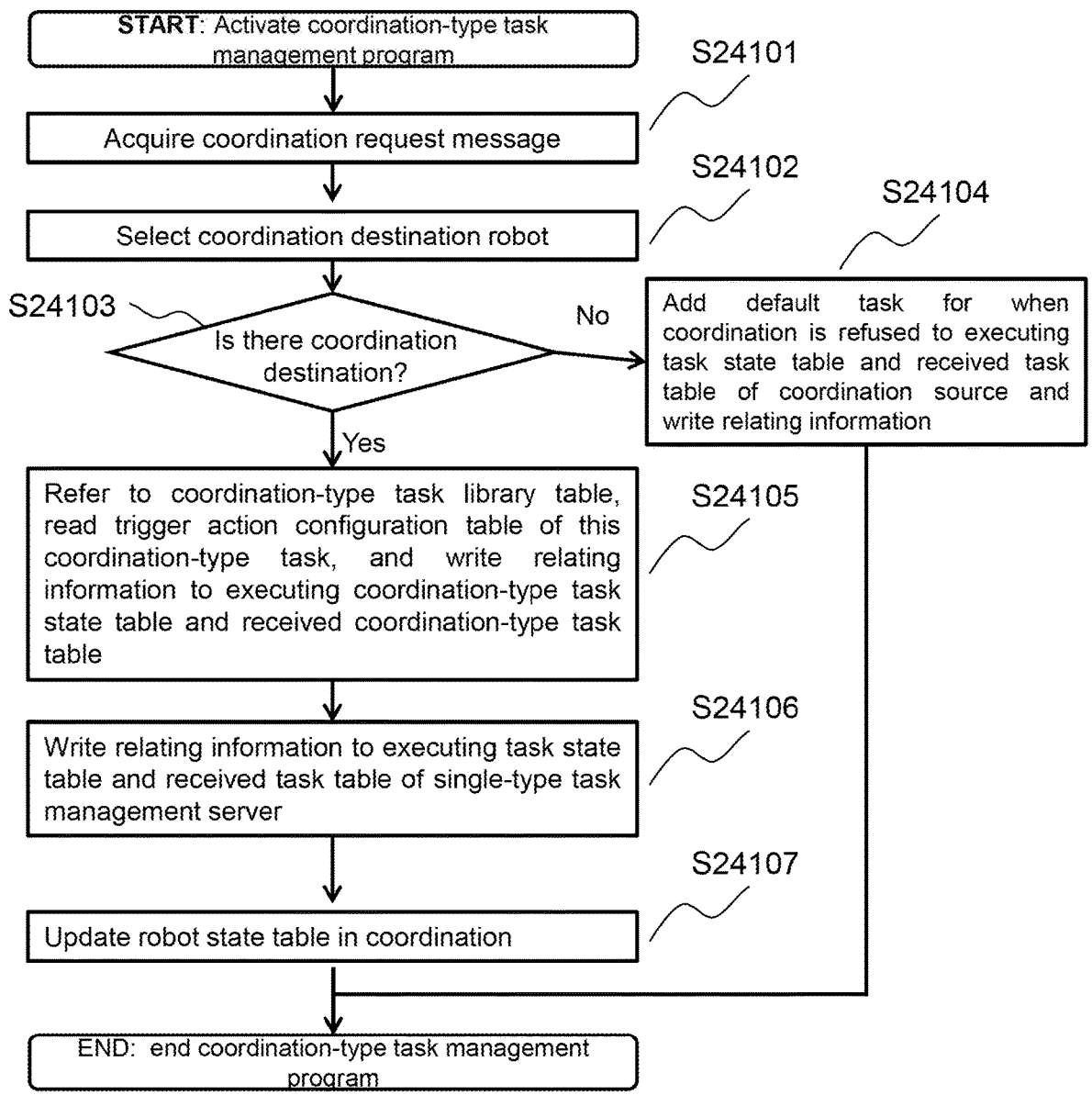
FIG. 25 is a flowchart of coordination-type task initial processing.

FIG. 25 is a flowchart of coordination-type task initial processing. When the coordination-type task management program 241 receives the coordination request message M2 via the communication interface 25 in Step S24101, the coordination-type task management program 241 starts the task initial processing.

There may be a possibility that the transmission source of the coordination request message M2 is any one of the action execution program 143, the trigger determination program 144, and the task configuration terminal TST.

Subsequently, the coordination-type task management program 241 executes processing of selecting the coordination destination robot in Step S24102. The coordination-type task management program 241 refers to the coordination-type task library table 231 and the robot state table 135 with use of the universal task number M202 of the requested task and the request source ID M203 in the coordination request message M2, and selects the robot that can respond to the requested task.

Then, in Step S24103, the coordination-type task management program 241 determines whether there is a robot that can respond to the requested task, that is, a robot that serves as the coordination destination robot. As a method of determining whether there is a coordination destination robot, for example, there is a method of searching whether there is a robot satisfying the coordination condition 23103 in the coordination-type task library table 231 in the robot state table 135.

If there is no robot that serves as the coordination destination, the coordination-type task management program 241 migrates to Step S24104, and adds a row of the default task to be executed when the coordination is refused to the executing task state table 133 and the received task table 132 of the coordination source robot. Then, the coordination-type task management program 241 writes information relating to the default task in that row.

If there is a robot that serves as the coordination destination, the coordination-type task management program 241 specifies the robot as the coordination destination and migrates to Step S24105. In Step S24105, the coordination-type task management program 241 refers to the coordination-type task library table 231. Then, the coordination-type task management program 241 reads the first row of the trigger action configuration table 234 of the coordination-type task corresponding to the universal task number M202 and writes information relating to the coordination destination in the executing coordination-type task state table 233 and the received coordination-type task table 232.

The coordination destination and the coordination source in the trigger determination expression 23402 and the action 23404 are rewritten into a coordination destination ID indicating the robot to be the coordination destination and a coordination source ID indicating the robot specified as the coordination source.

Subsequently, in Step S24106, the coordination-type task management program 241 writes information relating to the coordination-type task in the executing task state table 133 and the received task table 132 of the single-type task management server in order to prevent the robots in coordination with each other from receiving other tasks that cannot be executed in parallel.

Lastly, in Step S24107, the coordination-type task management program 241 updates the task management number 13504 of the current task in the robot state table 135 with use of the robot IDs 13502 of the robots that are the coordination source and the coordination destination. As described above with use of FIG. 21 and FIG. 25, if the single-type task management program 141 determines that the task cannot be responded to by the single response, the coordination-type task management program 241 determines whether the task can be responded to by the coordination response. If the task can be responded to by the coordination response, the task is executed with use of the coordination-type task library table 231. At this time, the actions of the task are switched from the actions specified in the single-type task library table 131 to the actions specified in the coordination-type task library table 231. At this time, a handover action to be executed by at least one of the coordination source robot and the coordination destination robot is inserted so that the user can recognize that a robot has been replaced.

Specifically, the coordination-type task management unit (coordination-type task management program 241) is configured to insert, when a certain robot (first robot) is allocated for execution of a certain action (first action) and another robot (second robot) is allocated for execution of another action (second action) after the first action, a handover action to be executed by at least one of the first robot and the second robot between the first action and the second action so that the user can recognize that a robot has been replaced. The user can be caused to recognize that a robot has been replaced by the handover action when the robot is replaced between the actions forming the task, and hence a natural personal service that does not cause discomfort to the user can be attained.

At this time, the handover action may be an easy operation, and it may be configured in the trigger action information that the second action can be executed in parallel with other actions or that the second action cannot be executed in parallel with other actions. As a result, when a plurality of robots are in coordination, the behavior of the second robot is started after the replacement from the first robot to the second robot is caused to be recognized by user, and hence a natural coordination is reliably achieved.

Figure 26:
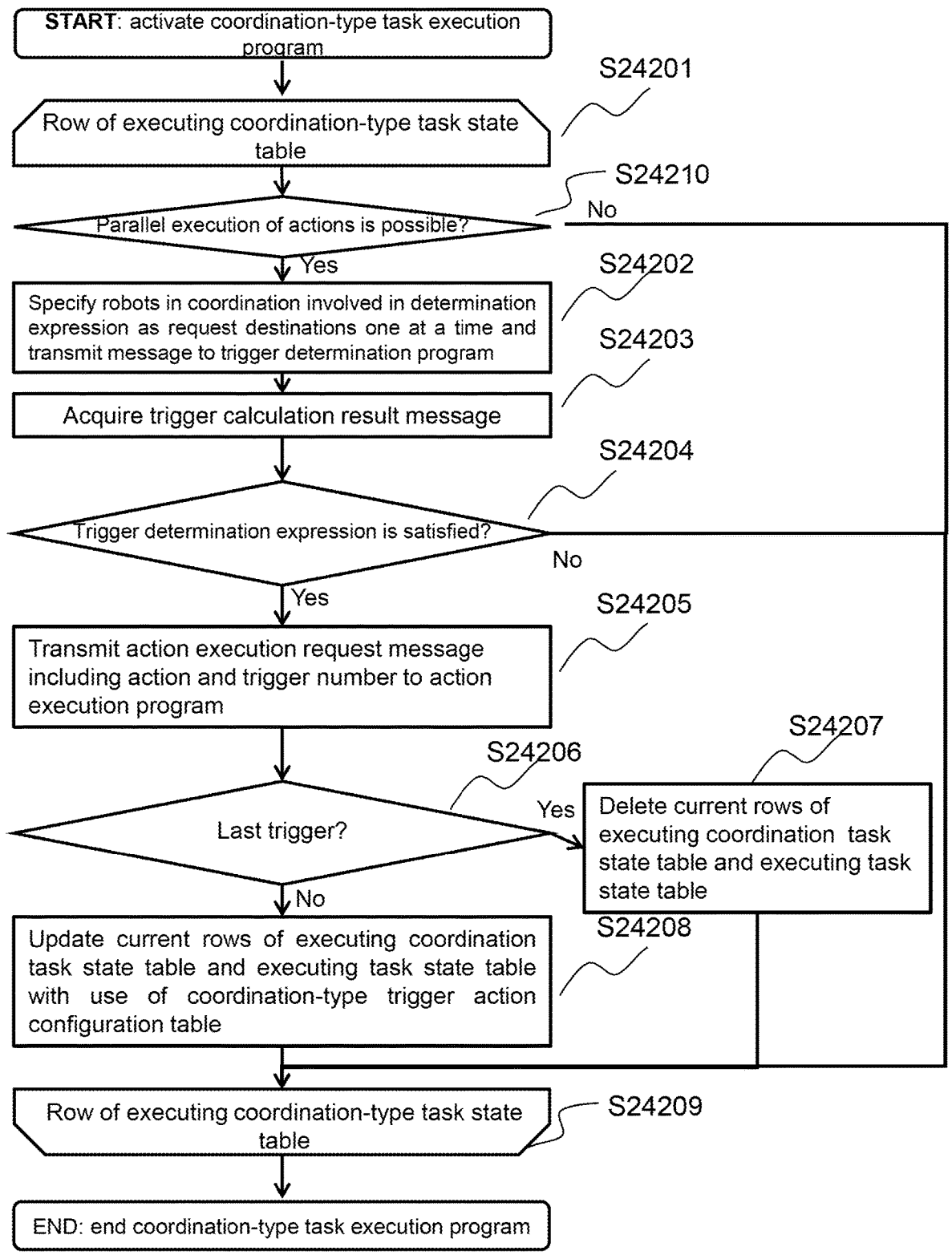
FIG. 26 is a flow chart of coordination-type task execution processing.

Coordination-type task execution processing in which the coordination-type task execution program 242 proceeds with the coordination-type task by stages in units of actions is described. FIG. 26 is a flow chart of the coordination-type task execution processing. In Step S24201, the coordination-type task execution program 242 scans the executing coordination-type task state table 233 in units of rows and repeats the following processing.

In Step S24210, the coordination-type task execution program 242 determines whether the task executed by the robot executing the task can be executed in parallel with other tasks. If the robots are executing a plurality of tasks in parallel with each other, the coordination-type task execution program 242 determines whether the action to be executed next in the task and the actions of all the other tasks currently executed by the robots can be executed in parallel with each other.

If parallel execution is not possible, the coordination-type task execution program 242 migrates to Step S24209. If parallel execution is possible, in Step S24202, the coordination-type task execution program 242 reads the current trigger determination expression 23302 of the scanned row and checks the robots to be involved in the determination of the trigger determination expression by the argument of the function included in the trigger determination expression 23302.

Then, the coordination-type task execution program 242 specifies the checked involving robot as the request destination one at a time and transmits the trigger calculation request message M5 to the trigger determination program 144 via the communication interface 25. The character string indicating the function involved in the robot that is the request destination is installed in the section of "the trigger calculation expression" in each transmitted trigger calculation request message M5.

In Step S24203, the coordination-type task execution program 242 receives each trigger calculation result message M6 corresponding to each transmitted trigger calculation request message M5 and checks the message identifier M601. In Step S24204, the coordination-type task execution program 242 checks whether the current trigger determination expression 23302 is satisfied with use of the calculation results of all the trigger calculation result messages M6 acquired in Step S24204.

If the trigger determination expression is not satisfied, the coordination-type task execution program 242 migrates to Step S24209 without executing the action corresponding to the trigger determination expression. If the trigger determination expression is satisfied, the coordination-type task execution program 242 migrates to Step S24205 to execute the action corresponding to the trigger determination expression. In Step S24205, the coordination-type task execution program 242 checks the coordination robots to be involved in the action from the character string of the action 23404 of the row corresponding to the trigger determination expression, and transmits the action execution request message M7 in which the checked involving robots are specified as the request destinations one at a time and which includes the current trigger number 23305 to the action execution program 143.

Subsequently, in Step S24206, the coordination-type task execution program 242 checks whether the action executed in Step S24205 is the last action of the task. As a method of checking whether the action is the last action, there is a method of checking whether the trigger number 23305 is the last number in this Embodiment. If the executed action is the last action, the coordination-type task execution program 242 deletes the current row of the executing task state table 144 and the executing coordination-type task state table 244 in Step S24207 and migrates to Step S24209.

If the executed action is not the last action, the coordination-type task execution program 242 migrates to Step S24208. In Step S24208, the coordination-type task execution program 242 refers to the coordination-type trigger action configuration table 234 and updates the current rows of the executing coordination-type task state table 244 and the executing task state table 144 with use of information of the row corresponding to the next action of the executed action. Lastly, the coordination-type task execution program 242 migrates to Step S24209.

Figure 27:
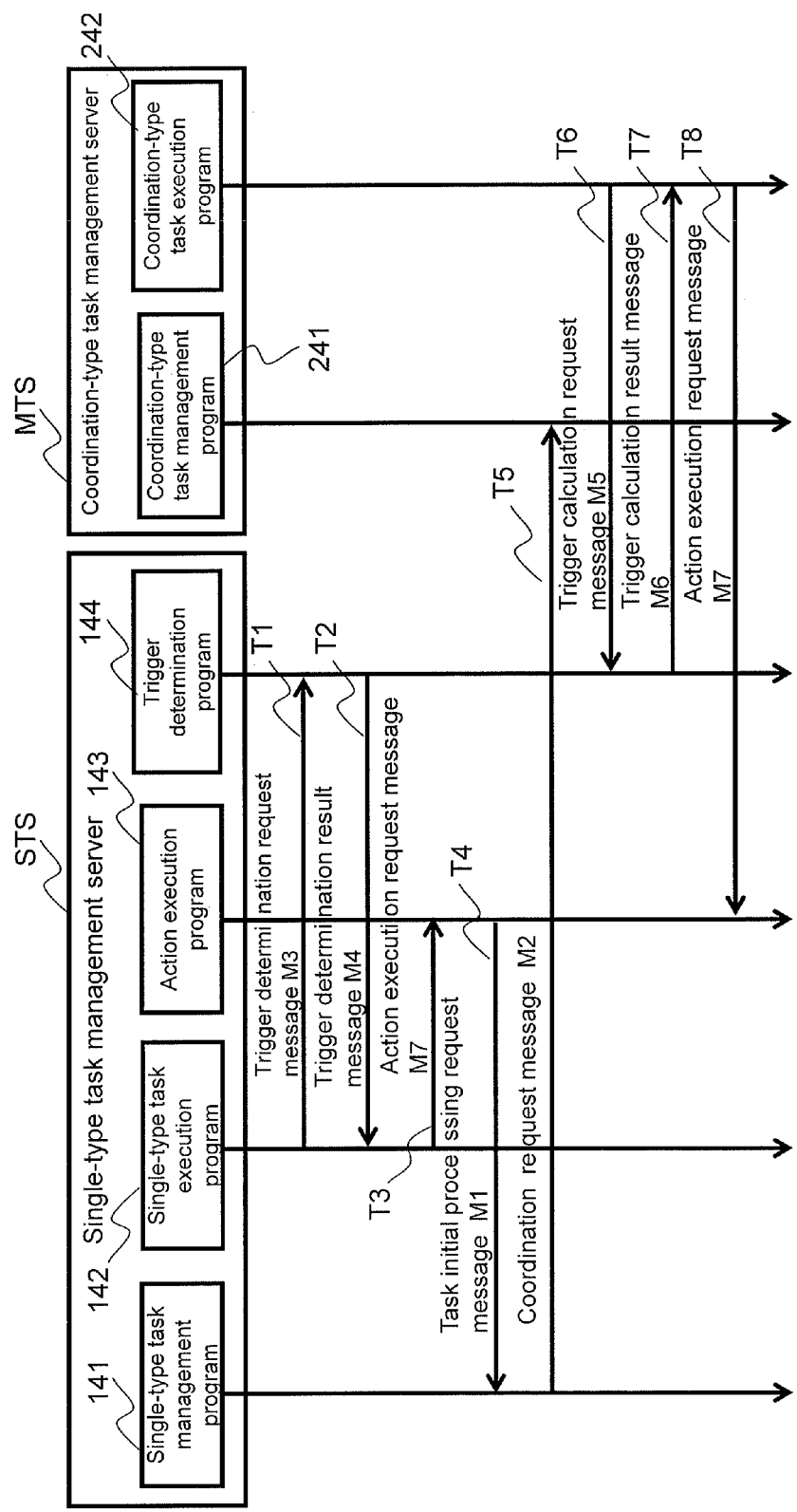
FIG. 27 a sequence diagram for illustrating how the single-type task management server STS and the coordination-type task management server MTS exchange messages.

FIG. 27 is a sequence diagram for illustrating how the single-type task management program 141, the single-type task execution program 142, the action execution program 143, and the trigger determination program 144 in the single-type task management server STS and the coordination-type task management program 241 and the coordination-type task execution program 242 in the coordination-type task management server MTS exchange messages with each other. FIG. 27 illustrates a typical example.

First, the single-type task execution program 142 transmits the trigger determination request message M3 to the trigger determination program 144 in accordance with Step S14203 (Step T1). Then, the trigger determination program 144 performs determination in accordance with the flow chart illustrated in FIG. 23, and returns the trigger determination result message M4 to the single-type task execution program 142 (Step T2). In the example, the trigger determination result M402 of the determination result message is "true".

The single-type task execution program 142 generates the action execution request message M7 and transmits the action execution request message M7 to the action execution program 143 in accordance with Step S14206 (Step T3). In this example, the action M702 in the action execution request message M7 is an action of executing another task. The action execution program 143 transmits the task initial processing request message M1 to the single-type task management program 141 (Step T4).

Then, the single-type task management program 141 receives the message M1 and executes the task initial processing.

In this example, in Step S14110, the single-type task management program 141 determines whether the task can be responded to by the coordination response. The single-type task management program 141 transmits the coordination request message M2 to the coordination-type task management program 241 (Step T5).

Subsequently, the coordination-type task management program 241 writes the information relating to the task in the executing coordination-type task state table 233 as illustrated in FIG. 25. Further, the coordination-type task execution program 242 scans the executing coordination-type task state table 233 and starts the processing of the task. In Step S24202, the coordination-type task execution program 242 transmits the trigger calculation request message M5 to the trigger determination program 144 (Step T6). Subsequently, the trigger determination program 144 performs determination in accordance to the flow chart illustrated in FIG. 23 and returns the trigger calculation result message M6 to the single-type task execution program 142 (Step T7). In this example, the coordination-type task execution program 242 determines that the trigger condition is satisfied with use of the trigger calculation result M602 of the determination result message in Step S24204. Then, the coordination-type task execution program 242 transmits the action execution request message M7 to the action execution program 143 (Step T8).

As described above, by providing measures for configuring the behavior of the robot as the series of actions by stages, the robot appropriately behaves in accordance with the environment, the situation, and the request at that time. Further, the robot can control how to proceed with the behavior by responding to the change in the surrounding situation like a human employee and the behavior of the robot is natural and friendly for and to the user. Thus, the user is able to easily and correctly understand the situation of the service. Therefore, the success rate and the client experience of the personal service are enhanced.

The Embodiment of the present invention is described with reference to the drawings, but the present invention is not limited to the Embodiment. For example, the physical configuration of the single-type task management server STS and the coordination-type task management server MTS is not particularly limited. The single-type task management server STS and the coordination-type task management server MTS may be mounted on the same apparatus. The functions of the single-type task management server STS may be placed separately among a plurality of apparatuses. The functions of the coordination-type task management server MTS may be placed separately among a plurality of apparatuses.

The present invention is not strictly limited to the Embodiment and can be embodied while the components are modified without departing from the gist thereof on an embodiment stage. Various inventions can be formed by properly combining a plurality of components disclosed in the Embodiment. For example, some components may be removed from all the components described in the Embodiment. The components in different Embodiments may be combined as appropriate.

What is claimed is:

1. A robot control system controlling a robot executing a personal service, the robot control system comprising:
   a central processing unit;
   an input/output device; and,
   a memory communicatively coupled to the central processing unit, the memory
   configured to store, in advance, trigger action information specifying a task to be executed by the robot, the task being formed by a series of actions, and specifying a trigger condition associated with an action in the series of actions, the trigger condition provided for starting the action in the series of actions;
   the central processing unit configured to determine whether a trigger condition of the action is satisfied;
   to execute the action;
   to sequentially select the action specified in the trigger action information of the task to be executed by the robot, to determine whether a trigger condition of the selected action is satisfied, and execute the selected action when the trigger condition is satisfied;
   wherein the robot control system is configured to control a plurality of robots working in coordination with each other to execute the task formed by the series of actions, the robot control system additionally comprising a coordination-type task management unit for determining that the task be responded to by a coordination response, the plurality of robots including a first robot allocated for execution of a first action of the task, and a second robot allocated for execution of a second action of the task which is started after completion of the first action of the task by the first robot;
   wherein, upon the first robot exhibiting a behavior departing from the behavior expected by a person executing the personal service, the central processing unit inserts a handover action to be executed by the first robot between the first action and the second action;
   the handover action being configured in the trigger action information and providing an indication to the user of coordination and replacement of the first robot by the second robot to provide the personal service in a way that appears natural to the user and eliminates user discomfort.

2. The robot control system according to claim 1, wherein:
   the trigger action information further has information on whether the action can be executed in parallel with other actions configured therein; and
   the central processing unit determines whether the trigger condition of the selected action is satisfied during execution of a preceding action when the selected action can be executed in parallel with other actions, and determines whether the trigger condition of the selected action is satisfied after the preceding action has ended when the selected action cannot be executed in parallel with other actions.

3. The robot control system according to claim 1, wherein the central processing unit manages the execution of the task,
   stores therein task library information for specifying, for each task of a plurality of tasks, whether the task is a task that can be executed in parallel with other tasks of the plurality of tasks; and
   refers to the task library information when the execution of the task is requested, starts the execution of the task regardless of whether other tasks are being executed as long as the task can be executed in parallel with other tasks, checks whether other tasks are being executed when the task cannot be executed in parallel with other tasks, and executes the task after other tasks have ended when other tasks are being executed.

4. The robot control system according to claim 2, wherein the central processing unit is configured to manage the execution of the task, wherein:
   the central processing unit stores therein task library information for specifying, for each task of a plurality of tasks, whether the task is a task that can be executed in parallel with other tasks of the plurality of tasks; and
   the central processing unit refers to the task library information when the execution of the task is requested, starts the execution of the task regardless of whether other tasks are being executed as long as the task can be executed in parallel with other tasks, checks whether other tasks are being executed when the task cannot be executed in parallel with other tasks, and executes the task after other tasks have ended when other tasks are being executed.

5. The robot control system according to claim 1, wherein the robot usable for the personal service is provided in plurality,
   in the trigger action information, allocation of the robot to execute the action can be configured, for each action in the series of actions,
   the central processing unit of the robot control system configured to execute each action in the series of actions included in the trigger action information with use of the robot allocated for the execution of the action in the trigger action information.

6. The robot control system according to claim 2, wherein the robot usable for the personal service is provided in plurality, in the trigger action information, allocation of the robot to execute the action can be configured, for each action in the series of actions, the central processing unit of the robot control system configured to execute each action included in the trigger action information with use of the robot allocated for the execution of the action in the trigger action information.

7. The robot control system according to claim 5, wherein the central processing unit is configured to configure an action included in a task and a robot to be used in the execution of the action on the basis of a required capability required for each action in the series of actions included in the task.

8. The robot control system according to claim 6, wherein the central processing unit is configured to configure an action included in a task and a robot to be used in the execution of the action on the basis of a required capability required for each action in the series of actions included in the task.

9. The robot control system according to claim 8, wherein the central processing unit inserts, when the first robot is allocated for execution of the first action and the second robot is allocated for execution of the second action after the first action, the handover action to be executed by the first robot between the first action and the second action so that the user can recognize robot replacement.

10. The robot control system according to claim 9, wherein the central processing unit can configure in the trigger action information to the effect that the second action cannot be executed in parallel with other actions.

11. The robot control system according to claim 7, wherein the central processing unit looks into whether there is a robot comprising a required capability required for all the actions included in the task and preferentially allocates, when there is a robot having the required capability, the robot to the action included in the task.

12. The robot control system according to claim 8, wherein the central processing unit looks into whether there is a robot comprising a required capability required for all the actions included in the task and preferentially allocates, when there is a robot having the required capability, the robot to the action included in the task.

13. The robot control system according to claim 11, wherein:
the actions included in the task may comprise an omittable action of which execution is omittable; and
the central processing unit looks into whether there is a robot having an essential required capability that is a required capability required for all actions other than the omittable action included in the task when there is no robot comprising the required capability required for all the actions included in the task, and preferentially allocates, when there is a robot having the essential required capability, the robot to the action included in the task.

14. The robot control system according to claim 12, wherein:
the actions included in the task may comprise an omittable action of which execution is omittable; and the central processing unit looks into whether there is a robot having an essential required capability that is a required capability required for all actions other than the omittable action included in the task when there is no robot comprising the required capability required for all the actions included in the task, and preferentially allocate, if there is a robot having the essential required capability, the robot to the action included in the task.

15. The robot control system according to claim 7, wherein:
the action included in the task comprises an omittable action of which execution is omittable; and
the central processing unit determines, when an action of which required capability cannot be satisfied by any robot is an omittable action, the omission of the omittable action.

16. The robot control system according to claim 8, wherein:
the action included in the task comprises an omittable action of which execution is omittable; and
the central processing unit determines, when an action of which required capability cannot be satisfied by any robot is an omittable action, the omission of the omittable action.

17. A robot control method for controlling a plurality of robots executing a personal service, the robot control method comprising:
storing therein, in advance, trigger action information specifying a task to be executed by the plurality of robots, the task being formed by a series of actions, and specifying a trigger condition associated with an action in the series of actions, the trigger condition provided for starting the action in the series of actions;
sequentially selecting the action specified in the trigger action information of the task to be executed by the plurality of robots and determining whether a trigger condition of the selected action is satisfied;
executing the selected action when the trigger condition is satisfied;
the plurality of robots working in coordination with each other to execute the task formed by the series of actions, the plurality of robots including a first robot allocated for executing a first action of the task and a second robot allocated for executing a second action of the task which is started after completion of the first action of the task by the first robot, wherein the first robot exhibits a behavior departing from behavior expected by a person executing the personal service; and,
inserting a handover action to be executed by the first robot between the first action and the second action;
configuring the handover action in the trigger action information, the handover action providing an indication to the user of coordination and replacement between the first robot and the second robot to provide the personal service in a way that appears natural to the user and eliminates user discomfort.

* * * * *